(12) United States Patent
Mizuno et al.

(10) Patent No.: US 6,458,467 B1
(45) Date of Patent: Oct. 1, 2002

(54) OPTICAL-USE ADHESIVE FILM AND ROLL THEREOF

(75) Inventors: Naoki Mizuno; Mikio Matsuoka, both of Ohtsu; Tomonori Yoshinaga, Inuyama; Tadaaki Yoshinaka, Inuyama; Shinichi Tsukada, Inuyama, all of (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/489,031

(22) Filed: Jan. 21, 2000

(30) Foreign Application Priority Data

| Jan. 21, 1999 | (JP) | 11-013485 |
| Nov. 1, 1999 | (JP) | 11-311338 |
| Nov. 16, 1999 | (JP) | 11-326056 |
| Nov. 16, 1999 | (JP) | 11-326059 |
| Nov. 16, 1999 | (JP) | 11-326060 |

(51) Int. Cl.$^7$ .............................................. B32B 27/36
(52) U.S. Cl. ...................... 428/480; 428/141; 428/143; 428/423.7; 428/355 N
(58) Field of Search ................................ 428/141, 143, 428/480, 423.7, 355 N

(56) References Cited

U.S. PATENT DOCUMENTS

| 3,922,416 A | * 11/1975 | Ryan .................................. 359/3 |
| 4,592,623 A | * 6/1986 | Yamamoto et al. ............ 349/122 |
| 6,165,602 A | * 12/2000 | Fujita ............................. 428/213 |

FOREIGN PATENT DOCUMENTS

| JP | 4-85248 | 3/1992 |
| JP | 4-85249 | 3/1992 |
| JP | 6-340049 | 12/1994 |
| JP | 9-124199 | 5/1997 |

* cited by examiner

*Primary Examiner*—William P. Watkins, III
(74) *Attorney, Agent, or Firm*—Morrison & Foerster, LLP

(57) ABSTRACT

An optical-use adhesive film comprises a base film of the optical-use adhesive film is a biaxially oriented polyester film having a thickness equal to or more than 50 μm, and an adhesive polymer layer laminated on at least one surface of the base film. Refractive indexes of the base film in longitudinal and transverse directions are both in the range of from 1.55 to 1.70 and refractive indexes of the adhesive layer and the base film satisfies the following formula (1):

$$(Nx-Nc)^2 + (Ny-Nc)^2 \leq 0.0300 \qquad (1),$$

wherein Nx and Ny respectively indicate refractive indexes in longitudinal and transverse directions of a base film and Nc is a refractive index of an adhesive layer.

20 Claims, 3 Drawing Sheets

OPTICAL-USE ADHESIVE FILM AND ROLL THEREOF

TECHNICAL FIELD

The present invention relates to an optical-use adhesive film and a biaxially oriented polyester film. More particularly, the invention relates to a biaxially oriented adhesive polyester film well suited for optical applications such as a base film of a prism lens sheet (Brightness Enhance Film) in a LCD, base films for a hard coat processed film and a base film for an AR(anti-reflection) film, and a protective film in a CRT.

BACKGROUND ART

A biaxially oriented polyester film has widely been used as various kinds of optical-use films because of the superior transparency, dimensional stability and chemical resistance.

Especially, in a case where the biaxially oriented polyester film is adopted as a base film for a prism lens sheet used in LCD, base films for hard coat processed film and an anti-reflection film, and a protective film used for CRT, the polyester film having a relatively large thickness of 50 $\mu$m or more has been preferred in order to meet requirements for superior mechanical strength and dimensional stability. Generally such an optical-use film has been encountered by requirements not only for superior adhesiveness suitable for prism lens processing, hard coat processing and anti-reflection processing, which are post-processing, but for extreme scarcity of fine foreign matters included in a film that is a cause for optical defects. Another requirement remains for a superior transparency.

Generally, a biaxially oriented polyester film, however, has been known its poor adhesiveness to other materials such as an acryl-based resin constituting a prism lens and a hard coat layer as a main component. Hence, a proposal has been presented in JP 94-340049, for example, in which an adhesive layer made from polyurethane resin or the like is laminated on a polyester. However, a polyester film on which an adhesive layer made from polyurethane resin is laminated can be improved in adhesion to an outer layer such as a hard coat, whereas the polyurethane layer has no sufficient adhesion to a polyester film as a base, which eventually leads to a problem of insufficient adhesion to the outer layer.

Further, in order to improve a slip property of the film, there has generally been adopted a technique in which surface irregularities such as peaks and valleys are imparted on a film surface by introducing particles into the film, but the particles in the film is a cause for poor transparency thereof. Accordingly, in order to attain a highly transparent film, it is desired that a content of the particles, which are incorporated to impart a slip property to the base film, is at a low level, or no particles are contained.

Further, a refractive index of a coating layer used for imparting adhesive also produces a problem since a light transmittance changes by interference between lights respectively reflected from front and rear surfaces of a film: a coating layer with superior adhesiveness decreases a light transmittance of a film applied with coating layer.

In addition, a conventional polyester film has an irregularity in thermal shrinking ratio over a surface thereof: a thermal shrinking ratio along a longitudinal (machine) direction is different according to a measuring position along a transverse direction. Therefore, when the polyester film is used for an optical-use film, lengths of both side ends of the polyester film differently change from each other due to transverse unevenness of longitudinal thermal shrinking ratio in a heat treatment step of post-processing such as prism lens processing, hard coat processing and anti-reflection processing, thereby a problem has been arisen. The reason why the problem has arisen is such that, for example, both side ends of such the polyester film are rubbed by a frame of a machine base or the like in the heat treatment step due to a difference in the length change between both sides when the film passes through the machine, with the result that the side ends receive some damages: a pass-through property of the film is worsened in a post-processing step, further leading to reduction of its productivity in a post-processing step. Especially, development in large-sized display panel such as of a note-type personal computer and a CRT has rapidly progressed in recent years, whereby the problem will be more and more serious when in wider product application.

Further, when a conventional optical-use adhesive film with a biaxially oriented base film of polyethylene terephthalate is subjected to a heat treatment step at a temperature in the range of from 100 to 150° C. in post-processing such as prism lens processing and hard coat processing, a problem has arisen since a haze value of film increases and a white appearance defect is generated. The problem leads direct to low visibility and reduced quality, improvement of which has been desired.

Still further, a problem has arisen since warpage arises by shrinkage of a polyester film in a heat treatment of the post-processing step and not only is a pass-through property deteriorated but reduction in productivity occurs. Another problem has also arisen since such a deterioration of the pass-through property is a hindrance in assembly of a liquid crystal display apparatus. Such a warpage of a film caused by a heat treatment accompanying the post-processing step has been demanded to be the smallest possible.

As described above, the optical-use film has been requested so as to have adaptability in the post-processing step such as prism lens processing, hard coat processing and anti-reflection processing.

DISCLOSURE OF THE INVENTION

In light of the above-described problems, it is an object of the invention to provide an optical-use adhesive film that has adhesive and superior transparency in an optical-use film application in which an adhesive layer is necessary on at least one surface of a film and which has a small thickness variation ratio.

It is another object of the invention to improve an adaptability of the optical-use adhesive film in a post-processing step such as prism lens processing, hard coat processing or anti-reflection processing. More particularly, it is the object of the invention to provide the optical-use adhesive film whose transportability can be improved in a thermal treatment of a post-processing step, increase in whose haze value is small and whose warpage is small.

The present inventors have conducted serious studies in order to achieve the objects and discovered that the objects of the present invention can be achieved by the following means:

1. An optical-use adhesive film, comprising a base film of the optical-use adhesive film is a biaxially oriented polyester film having a thickness equal to or more than 50 $\mu$m, and an adhesive polymer layer laminated on at least one surface of the base film, wherein refractive indexes of the base film in longitudinal and transverse directions are both in the range of from 1.55 to 1.70 and that refractive indexes of the adhesive layer and the base film satisfies the following formula (1):

$$(Nx-Nc)^2+(Ny-Nc)^2 \leq 0.0300 \quad (1),$$

wherein Nx and Ny respectively indicate refractive indexes in longitudinal and transverse directions of a base film and Nc is a refractive index of an adhesive layer.

2. An optical-use adhesive film according to claim 1, wherein a thickness of the base film is in the range of from 100 to 300 μm.

3. An optical-use adhesive film according to claim 1, wherein the biaxially oriented polyester film is a polyester film made from polyethylene terephthalate as a main component.

4. An optical-use adhesive film according to claim 1, wherein the polymer adhesive layer includes a copolymerized polyester-based resin and a polyurethane-based resin.

5. An optical-use adhesive film according to claim 4, wherein the copolymerized polyester-based resin has a branched monomer as a constituent.

6. An optical-use adhesive film according to claim 1, wherein the polymer adhesive layer includes particles.

7. An optical-use adhesive film according to claim 6, wherein the adhesive layer include particles having an average size in the range of from 20 nm to 300 nm, only the lower limit being included, and particles of an average size in the range of from 300 nm to 1000 nm, both limits being included.

8. An optical-use adhesive film according to claim 1, wherein a haze value of the optical-use adhesive film is equal to or less than 1.0%.

9. An optical-use adhesive film according to claim 1, wherein that a thickness variation ratio is equal to or less than 3%.

10. An optical-use adhesive film according to claim 1, wherein a difference between the maximum value of a longitudinal thermal shrinking ratio and the minimum value thereof along a transverse direction of the optical-use adhesive film is equal to or less than 0.2%.

11. An optical-use adhesive film according to claim 1, wherein an adhesiveness of the optical-use adhesive film when a photo-curable acryl-based coating layer is laminated on an adhesive layer is equal to or higher than 85% in adhesiveness obtained from the following formula (2) whose valuables on its left side are determined by a testing method in conformance with description in a section 8.5.1 of JIS-K5400;

$$\text{Adhesiveness }(\%)=(1-\text{peel area/test area})\times 100 \quad (2).$$

12. An optical-use adhesive film according to claim 1, wherein a total light transmittance of the optical-use adhesive film is equal to or higher than 90% and an increase in haze value after the optical-use adhesive film receives a heat treatment at 150° C. for 120 min is equal to or less than 0.5%.

13. An optical-use adhesive film according to claim 1, wherein a content of cyclic trimers in the base film is equal to or less than 5000 ppm.

14. An optical-use adhesive film according to claim 1, wherein a total light transmittance of the optical-use adhesive film is equal to or higher than 90% and a warpage of the optical-use adhesive film in a specimen size 300 mm×210 mm after the optical-use adhesive film receives a heat treatment at 150° C. for 3 hr is equal to or less than 3 mm.

15. A biaxially oriented polyester film, comprising protrusions are formed, by an emboss-processing roll, on at least one surface of the biaxially oriented polyester film in the neighborhoods of both ends in a transverse direction thereof, wherein a ratio of a sum of vertical projection areas on a film surface of the biaxially oriented polyester film of portions thereof deformed by emboss processing, to a total area of the biaxially oriented polyester film with which the emboss-processing roll is put into contact is in the range of from 0.01 to 0.25.

16. An optical-use adhesive film according to claim 1, wherein protrusions are formed, by an emboss-processing roll, on at least one surface of the optical-use adhesive film in the neighborhoods of both ends in a transverse direction thereof, wherein a ratio of a sum of vertical projection areas on a film surface of the optical-use adhesive film of portions thereof deformed by emboss processing, to a total area of the optical-use adhesive film with which the emboss-processing roll is put into contact is in the range of from 0.01 to 0.25.

17. An optical-use adhesive film according to claim 16, wherein a vertical projection area on a film surface of the optical-use adhesive film of any one portion thereof deformed by emboss processing is in the range of from 0.01 to 0.2 $mm^2$.

18. An optical-use adhesive film according to claim 16, wherein a height of a portion of the optical-use adhesive film deformed by emboss-processing is in the range of from 1 to 20% of an average thickness of a non-processed region thereof.

19. An optical-use adhesive film according to claim 16, wherein an average thickness of a non-processed region of the optical-use adhesive film is in the range of from 30 to 300 μm and an average height of portions of the optical-use adhesive film deformed by emboss-processing is in the range of from 3 to 30 μm.

20. An optical-use adhesive film according to claim 16, wherein a width of a region that is emboss-processed in the optical-use adhesive film is in the range of from 5 to 20 mm.

21. A roll that is obtained by take-up a biaxially oriented polyester film according to claim 15.

22. A roll that is obtained by take-up an optical-use adhesive film according to claim 16.

BEST MODE FOR CARRYING OUT THE INVENTION

Figure 1:
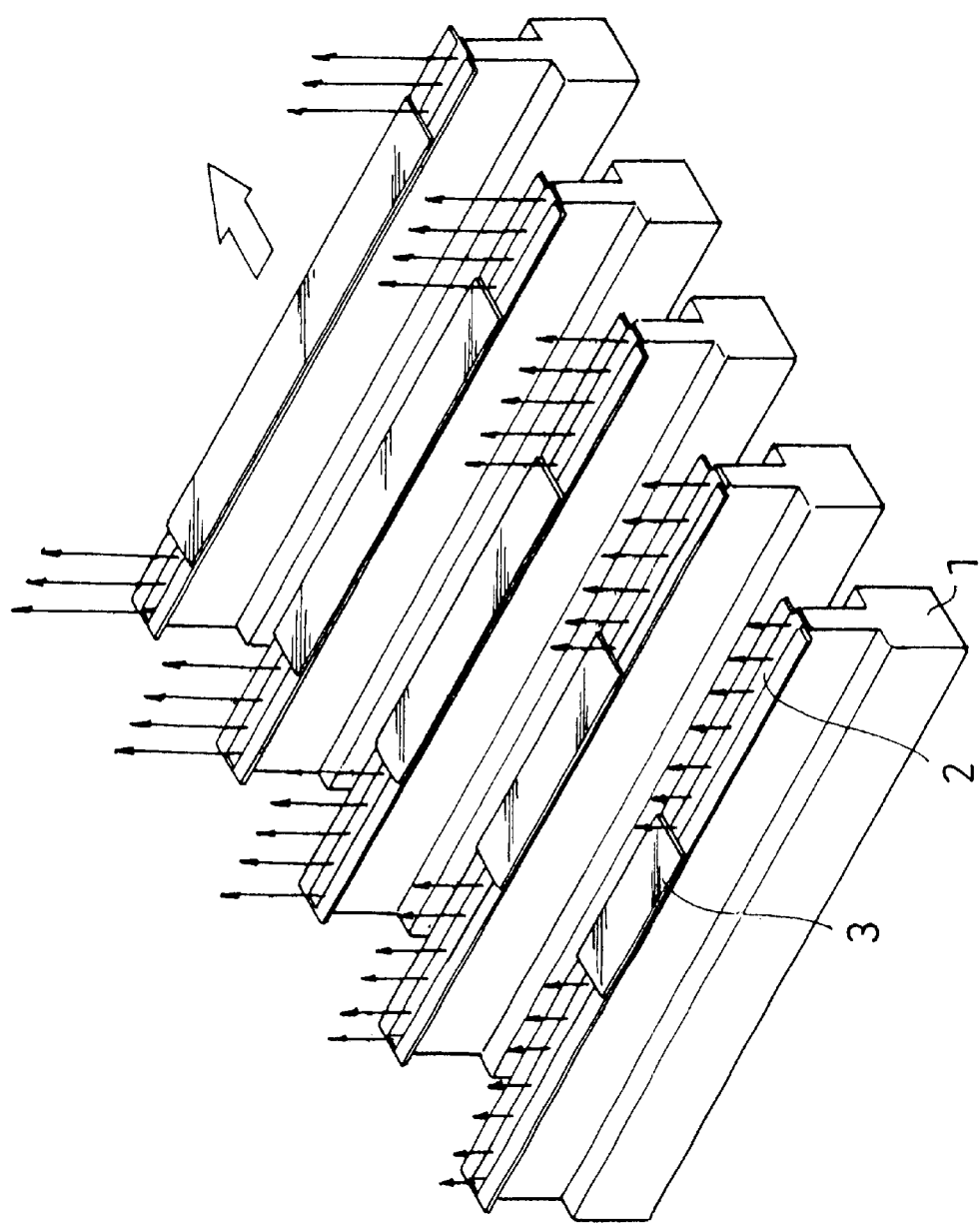
FIG. 1 is a perspective view of a state in which an optical-use adhesive film is thermo-set while part of an opening of each of plenum ducts is closed.

Below, description will be made of an embodiment of an optical-use adhesive film of the invention on at least one surface of whose base film an adhesive polymer layer is laminated.

A biaxial oriented polyester film, which is a base film, of the present invention has requirements for proper selection of longitudinal and/or transverse draw ratio in order to retain a mechanical strength of an optical-use adhesive film to be equal to or higher than a certain value and ensure levels of thickness variation and transparency. It is known that if a thickness variation ratio is large, a strain arises over passage of time in a portion of a base film where thickness variation occurs by the time when processing in a next step gets started after take-up of the base film on a core reel. Especially, when the biaxially oriented polyester film is used for optical applications such as a base film of a prism lens sheet that is used for LCD, base films of hard coat processing and an anti-reflection film, and a protective film for CRT, an influence of the strain strongly acts, whereby an optical-use adhesive film with a small thickness variation ratio is requested, wherein a thickness variation ratio is preferred to be equal to or less than 3%.

In order to use the biaxially oriented polyester film in an optical application while retaining a thickness variation ratio and a mechanical strength to levels, there arises a necessity of stretching a base film without any deterioration of transparency of the film. From this necessity, longitudinal and transverse refractive indexes are required to be in the range of from 1.55 to 1.70, or preferably in the range of from 1.60 to 1.70. If refractive indexes fall outside this range, it is not preferred since a thickness variation ratio is excessively large. A method by which refractive indexes are confined within the range can be selected from longitudinal and transverse stretching conditions such as a temperature and draw ratios.

On the other hand, when the optical-use adhesive film is used in an optical application, a difference in refractive index between an adhesive layer and a base film causes light reflection by the interface there between with ease, which makes light transmittance lowered.

To suppress a light transmittance from being lowered makes it not only important for refractive indexes of the adhesive layer and base film to be close to each other, but also necessary for refractive indexes of the adhesive layer and base film to satisfy the following equation (1):

$$(Nx-Nc)^2+(Ny-Nc)^2 \leq 0.0300 \quad (1),$$

wherein Nx and Ny indicate longitudinal and transverse refractive indexes of a base film and Nc indicates a refractive index of an adhesive layer.

Further, refractive indexes of the adhesive layer and base film preferably satisfies the following equation (1a):

$$(Nx-Nc)^2+(Ny-Nc)^2 \leq 0.0200 \quad (1a).$$

A biaxially oriented polyester film, which is a base film, of the present invention in use may be made of polyethylene terephthalate, polybutylene terephthalate or polyethylene-2,6-naphthalate, or a polyester based resin such as a copolymer containing one of the polymers as a main component. Among them, a biaxially oriented film made from polyethylene terephthalate is especially preferred.

When a polyester copolymer is used as a resin forming a biaxially oriented polyester film, the following carboxylic acid components are each used, which are exemplified as follows: aliphatic dicarboxylic acids, such as adipic acid and sebacic acid; aromatic dicarboxylic acids, such as terephthalic acid, isophthalic acid, phthalic acid, and 2,6-naphthalene dicarboxylic acid; and polyfunctional carboxylic acids such as trimellitic acid and pyromellitic acid. Further, the following glycol components are each used, which are exemplified as follows: aliphatic glycols, such as ethylene glycol, diethylene glycol, 1,4-butanediol, propylene glycol and neopentyl glycol; aromatic glycols such as p-xylene glycol; alycyclic glycols such as 1,4-cyclohexanedimethanol; and polyethylene glycol of an average molecular weight in the range of form 150 to 20000 and others. A content of a copolymerized component in a copolymer is preferably less than 20 mol %. If a mol % of a copolymerized component is included to be equal or more than 20 mol %, there arise a case where a strength, transparency and heat resistance of a film become degraded.

A biaxially oriented polyester film, which is a base film, of the invention preferably, has a thickness equal to or more than 50 $\mu$m, or preferably in the range of from 100 to 300 $\mu$m.

Further, the above-described polyester-based resin may include various kinds of additives. The additives are exemplified: an anti-static agent, a UV absorber, anti-bacterial agent, a stabilizer and others.

On the other hand, the base film of the invention preferably does not contain substantially inert particles that are to impart a slip property to the film from the view point of transparency. No inclusion of inert particles is especially effective since an optical-use adhesive film of the invention can be obtained to be equal to or higher than 90% in total light transmittance and to be of high transparency. Virtually no inclusion of particles in a base film means that a measured value of a content of particles by a fluorescent X-ray analysis is equal to or less the detection limit.

It should be appreciated that an optical-use adhesive film of the invention is preferably prepared such that fine particles of uniform sizes is incorporated into an adhesive layer in-line laminated to form surface irregularities such as peaks and valleys on a film surface. That is, a slip property of the optical-use adhesive film is improved by the adhesive layer including fine particles and thereby, the optical-use adhesive film can further be imparted with a good take-up property and a scratch resistance, so that there arises no requirement for inclusion of particles in a base film.

Further, a content of a cyclic trimers included in the base film is preferably controlled to equal to or less than 5000 ppm, or more preferably to be equal or less than 4500 ppm. This is the result of the discovery made by the inventors that a main cause by which a conventional biaxially oriented polyester film has increase in haze value by heating is white defects and the white defects are constituted of cyclic trimers included in the base film which are a main component of oligomers. Means for reducing a content of cyclic trimers included in a base film to a value equal or less than the above described range is to reduce a content of cyclic trimers included in polyester-based resin as a starting material and decrease a residence time from the start of a melt extrusion step through the end of a casting step in a film formation process, which has been found by the inventors as the most useful means by which a content of cyclic trimers in the base film is decreased. With the means applied, an increase in haze value when an optical-use adhesive film was heated at 150° C. for 120 min was be able to be suppressed to a value equal to or less than 0.5%.

That is, it is effective to decrease a content of cyclic trimers included in a base film to a value equal to or less than 5000 ppm in order to suppress an increase in haze value to be equal to or less than 0.5% when an optical-use adhesive film of the present invention is heated at 150° C. for 120 min.

In order to reduce an amount of oligomers represented by cyclic trimers in the base film, it is preferred to conduct an oligomer reduction treatment under conditions to heat a raw material resin (polyester-based resin) at a temperature in the range of from 180° C. to 250° C., both limits being included, for a time period in the range of from 12 hr to 36 hr, both limits being included, under a pressure in the range of from 1013 hPa to 2026 hPa, only upper limit being included, under an inert gas atmosphere such as nitrogen. Further, more preferably, the oligomer reduction treatment is conducted under conditions to heat a raw material resin at a temperature in the range of from 200° C. to 230° C., both limits being included, for a time period in the range of from 12 hr to 36 hr, both limits being included, under a pressure in the range of from 1013 hPa to 1420 hPa, only upper limit being included.

In the oligomer reduction treatment, the following troubles occur: not only does coloring or the like caused by an oxidation reaction occur when oxygen is included in the working atmosphere, but strength of the film arises is decreased by reduction in polymerization degree of the resin (polyester resin) through hydrolysis when steam is present in the working atmosphere. When a pressure of the inert gas atmosphere is lower than 1013 hPa, a specially designed apparatus is necessary such that oxygen and steam may not intrude the inert atmosphere together with the outside air, while when a pressure higher than 2026 hPa is applied in the processing, no change occurs in the effect of reducing oligomers as compared with that exerted in the range.

If a temperature in the oligomer reduction treatment is higher than 250° C., disturbances such as melt attachment, melting, discoloring or the like of the resin (polyester-based resin) occur with ease. On the other hand, if the temperature is lower than 180° C., a sufficient oligomer reduction effect is hard to obtain. If a treatment time is shorter than 12 hr, a sufficient oligomer reduction effect is also hard to obtain and if the treatment time is longer than 36 hr, no change occurs in effect on increase in haze caused by a heat treatment of the base film as compared with that in the range.

A deactivation treatment that makes an activity of a catalyst lowered may be followed the oligomer reduction treatment in continuation. As such a deactivation treatment, there can be named: chemical treatments such as oxidation, reduction and hydration; and physical treatments such as acoustic wave application and electromagnetic wave irradiation, and so on. Further, a chemical modification such as etherification may be forced to occur at terminal -OH groups of molecular chain of a polymer (polyester-based resin) so as to suppress a regeneration reaction of oligomers such as trimers.

In a case where neither such a deactivation treatment of a catalyst nor a suppression treatment of an oligomer regeneration reaction is conducted, oligomers are regenerated in remelting raw material resin (polyester-based resin) for film production with elapse of time. Accordingly, a residence time from the remelting till extrusion/cooling is controlled so as to be equal to or less than 20 min, or more preferably equal to or less than 12 min, thereby, enabling a content of cyclic trimers after formation of a base film to be suppressed to be equal to or less than 5000 ppm, with the result that an optical-use adhesive film with small increase in haze value after heating can be produced.

An intrinsic viscosity of resin pellets used for a biaxially oriented polyester film is preferably in the range of 0.45 to 0.70 dl/g. If the intrinsic viscosity is lower than 0.45 dl/g, many of breaks occur in film formation. On the other hand, if the intrinsic viscosity is larger than 0.70 dl/g, high precision filtration becomes hard to conduct due to large increase in filtering pressure.

At least one adhesive layer of an optical-use adhesive film of the invention is laminated on at least one surface of a biaxially oriented polyester film. The lamination of the at least one adhesive layer is preferably conducted by means of an in-line coating method, wherein at least one adhesive layer is laminated on at least one surface of unoriented or uniaxially oriented polyester film and thereafter, stretching in at least one axial direction is performed, followed by thermo-setting. Fine particles of proper sizes is incorporated into the adhesive layer laminated by means of the in-line coating method and surface irregularities such as peaks and valleys are formed on a surface of the adhesive layer, thereby, enabling a good slip property, a good take-up property and scratch resistance to be imparted on the optical-use adhesive film.

Hence, since there is no necessity of incorporating fine particles into a biaxially oriented film, which is a base film, the lamination of the adhesive layer incorporated with fine particles is especially useful means for obtaining a high transparency optical-use adhesive film with a haze value such as equal to or less than 1.0%.

The term "adhesive" used in the invention means that adhesiveness of a test layer to an photo-curable acrylic resin-based coat layer is equal to or higher than 85%, preferably equal to or higher than 90%, or especially preferably equal to or higher than 95% when measured according to "an adhesiveness of a test layer to an photo-curable acrylic resin-based coating layer" described below, wherein the adhesiveness is a measured one that is obtained based on a testing method in conformance with description in a section 8.5.1 of JIS-K5400 using the following formula:

$$\text{Adhesiveness } (\%) = (1 - \text{a peel area}/\text{a test area}) \times 100 \tag{2}$$

In order to satisfy the above-described equation (2), it is important that a kind of resin used for an adhesive layer, and refractive indexes of particles incorporated into the adhesive layer and other additives are selected.

Therefor, while a resin can be selected in a proper manner as an adhesive layer, it is preferred that an adhesive layer of an optical-use adhesive film of the invention includes a copolymerized polyester based resin (A) and a polyurethane based resin (B) as main resin components. Further, in the invention, it is preferred to use a water-soluble coating liquid as a coating liquid for forming an adhesive layer.

While a copolymerized polyester-based resin (A) is singly used, adhesiveness to a polyester-based base film is sufficient, adhesiveness to an acrylic-based resin that is used in a prism lens and a hard coat is insufficient.

Further, while a polyurethane resin (B) is singly used, adhesiveness to a acrylic-based resin is sufficient, adhesiveness to a polyester-based base film is insufficient.

As a copolymerized polyester-based resin (A) used in an adhesive layer of the invention is preferably a resin including a dicarboxylic component and a branched glycol component. As a branched glycol component, the following are named: for example, 2,2-dimethyl-1,3-propanediol; 2-methyl-2-ethyl-1,3-propanediol; 2-methyl-2-butyl-1,3-propanediol; 2-methyl-2-propyl-1,3-propanediol; 2-methyl-2-isopropyl-1,3-propanediol; 2-methyl-2-n-hexyl-1,3-propanediol; 2,2-diethyl-1,3-propanediol; 2-ethyl-2-n-butyl-1,3-propanediol; 2-ethyl-2-n-hexyl-1,3-propanediol; 2,2-di-n-butyl -1,3-propanediol; 2-n-butyl-2-propyl-1,3-propanediol; and 2,2-di-n-hexyl-1,3-propanediol.

The above described branched glycol component is preferably incorporated in amount equal to or more than 10 mol % based on all glycol components, or especially preferably in amount equal to or more than 20 mol % based on all glycol components. Further, the branched glycol component is preferably incorporated in amount equal to or less than 80 mol % based on all glycol components. If in amount less than 10 mol %, an adhesiveness of the adhesive layer to a biaxially oriented polyester film tends to be insufficient.

As a glycol component other than the above named compounds, ethylene glycol is the most preferable. If an amount of a compound to be incorporated is limited to be small, the following compounds may be used: diethylene glycol, propylene glycol, butanediol, hexanediol, 1,4-cyclohexanedimethanol or the like.

As a dicarboxylic acid component that is included in a polymerized polyester-based resin (A) as constituent component, terephthalic acid or isophthalic acid is the most preferable. If an amount of a compound to be incorporated is limited to be small, the following compounds may be used in copolymerization: the other dicarboxylic acids, especially aromatic dicarboxylic acid such as diphenyl carboxylic acid and 2,6-naphthalenedicarboxylic acid.

Other dicarboxylic acids than the above described dicarboxylic acid component, 5-sulfoisophthalic acid is preferably used in the range of from 1 to 10 mol % in order to impart water dispersibility and instead of 5-sulfoisophthalic acid, the following compounds can be used: sulfoterephthalic acid; 4-sulfonaphthaleneisophthalic acid-2,7-dicarboxylic acid; and 5-(4-sulfophenoxy)isophthalic acid, and salts thereof.

As a polyurethane resin (B) that is used in an adhesive layer for an optical-use adhesive film of the invention, various kinds of coating materials, of a solvent type, of a non-solvent type and of a water-soluble type, can be used. For example, there can be named: a resin that includes a blocked isocyanate group, that is a water-soluble urethane of a thermal reaction type in which a terminal isocyanate group is blocked with a hydrophilic group.

As a blocking agent for an isocyanate group, there can be named: bisulfites and phenols, alcohols, lactams, oximes, and active methylene compounds, each including a sulfonic acid group and others. A blocked isocyanate group has a chance to make a urethane prepolymer hydrophilic or water-soluble. In a drying step or a thermo-setting step of film production process, when thermal energy is given to the urethane resin (B), then a blocking agent is separated from an isocyanate group and therefore, the polyurethane resin (B) not only fixes water-dispersible copolymerizaed polyester resin (A) that is mixed into a network produced by self-crosslinking, but reacts with a terminal group and others of the copolymerized polyester resin (A). While a resin in a coating liquid in adjustment has poor water resistance because of being hydrophilic, when the resin in a coating liquid has been coated, dried and thermo-set through a thermal reaction, the polyurethane resin (B) is transformed to a coat with good water resistance since a hydrophilic group that is a blocking agent is separated from the polyurethane resin (B).

Bisulfites are the most preferable since the compounds have requirements for a proper temperature and a proper time in heat treatment and are most widely used in the industries.

A urethane prepolymer used as the polyurethane resin (B) is a compound having a terminal isocyanate group that is obtained by reacting as follows: (i) a polyol that has two or more active hydrogen atoms in a molecule, or a compound of a molecular weight in the range of 200 to 20,000 having two or more active hydrogen atoms in a molecule, (ii) an organic polyisocyanate having two or more isocyanate groups in molecule and, if a need arises, further, (iii) a chain elongation agent that contains at least two active hydrogen atoms in molecule.

Generally known as the (i) compounds are compounds that contains two or more of hydroxyl groups, carboxylic groups, amino groups or mercapto groups at terminal ends or in molecular chain and especially preferable compounds are named: polyetherpolyol, polyetheresterpolyol and others.

As polyetherpolyols, there can be named: compounds obtained by polymerization of an alkylene oxide such as ethylene oxide or propylene oxide, or styrene oxide or epichlorohydrin, compounds obtained through random polymerization, block polymerization of the compounds, and a compound obtained by addition polymerization of the above described monomers to a polyhydric alcohol.

As polyesterpolyols and polyetheresterpolyols, straight chain compounds and branched chain compounds can mainly be named, which are obtained by condensation of the following compounds: polycarboxylic acid, saturated or unsaturated, or carboxylic anhydride, such as succinic acid, adipic acid, phthalic acid and maleic anhydride, and the following compounds: polyhydric alcohols, saturated or unsaturated, such as ethylene glycol, diethylene glycol, 1,4-butanediol, neopentyl glycol, 1,6-hexanediol and trimethylolpropane; polyalkyleneetherglycols such as a polyethylene glycol and a polypropylene glycol, each of a comparatively low molecular weight; or a mixture of the alocohols.

Furthermore, as polyesterpolyols, there can also be used polyesters obtained from lactone and hydroxy acid and further, as polyetheresterpolyol, there can also be used polyetheresters obtained by addition of ethylene oxide or propylene oxide or the like to polyesters that have been manufactured.

As the organic isocyanates of the (ii), there can be named: aromatic diisosyanates such as isomers of toluidineisocyanate and 4,4-diphenylmethanediisocyanate; aromatic aliphatic diisocyanates such as xylylenediisocyanate; alicyclic diisocyanates such as isophorone diisocyanate, 4,4-dicyclohexylmethanediisocyanate; aliphatic diisocyanates such as hexamethylenediisocyanate and 2,2,4-trimethylhexamethylenediisocyanates; and polyisocyanates that have been obtained by addition of the above described compounds, singly or in combination, to trimethylolpropane.

As chain elongation agents (iii) having two or more active hydrogen atoms, there can be named: glycols such as ethylene glycol, diethyleneglycol, 1,4-butanediol, and 1,6-hexanediol; polyhydric alcohols such as glycerin, trimetylol propane and pentaerythritol; diamines such as ethylene diamine, hexaethylenediamine and piperazine; aminoalcohols such as monoethanol amine and diethanol amine; thiodiglycol, such as thiodiethyleneglycol; and water. In order to synthesize a urethane polymer by using the compounds (iii), a reaction is generally performed, using the chain elongation agent, at a temperature equal to or less than 150° C. or preferably in the range of from 70 to 120° C. for a time period in the range of from 5 min to several hours by means of a single stage or multi-stage isocyanate polyaddition method, wherein while a ratio in number of isocyanate groups to active hydrogen atoms can freely be selected as far as the ratio is equal to or more than 1, a necessity is that free isocyanate groups remain in a urethane prepolymer obtained.

Further, a content of free isocyanate groups in urethane prepolymer is only required to be 10% by weight, but the content is preferable equal to or less than 7% by weight in consideration of stability of an aqueous solution of urethane polymer after blocking.

A urethane prepolymer thus obtained is subjected to a blocking operation preferably using bisulfites. The urethane prepolymer is mixed with an aqueous solution of a bisulfite and a reaction is performed for a time period in the range of from about 5 min to about 1 hr while well agitating the mixture and a reaction temperature is preferably controlled at a temperature equal to or lower than 60° C. After the reaction, a reaction mixture is diluted with water to a proper concentration and thereby, a thermal reaction type water-soluble urethane composition is obtained. A viscosity and a concentration of the composition are properly adjusted prior to use. When the composition is heated at a temperature in the range of from about 80 to about 200° C., normally, a bisulfite as a blocking agent is dissociated to regenerate an active isocyanate, so that a polyurethane polymer is produced by a polyaddition that occurs in a molecule or between molecules of the urethane prepolymer, or additions of the urethane prepolymer to other functional groups occur.

As one example of the polyurethane resin (B) having a blocked isocyanate group described above, a compound with a trade name "Elastron" made by Dai-ich Kogyo Seiyaku Co. is exemplified as a representative. Elastron is obtained by blocking isocyanate groups with sodium bisulfite and has a strong hydrophilic carbamoylsulfonate group at a molecular terminal end, whereby Elastron is water-soluble.

When a coating liquid is prepared by mixing a copolymerized polyester resin (A) having a branched glycol component and a polyurethane resin (B) having a blocked isocyanate group, a ratio by weight of the resin (A) and the resin (B) is preferably in the range of (A):(B)=90:10 to 10:90, or more preferably in the range of (A):(B)=80:20 to 20:80. If a content of the resin (A) is less than 10% by weight, coatability on a polyester-based base film is not sufficient and thereby, insufficient adhesiveness arises between the coating layer and the polyester-based base film. Further, if a content of the resin (B) is less than 10% by weight, practically sufficient adhesiveness cannot be obtained in a hard coat of a UV-curable type.

Further, in the invention, since virtually no inert particles that are used in the base film for the purpose to impart a slip property, it is preferred, in order to satisfy the above formula (1), to incorporate inert particles whose refractive index is close to that of a resin component composed of the copolymerized polyester-based resin (A) and the polyurethane-based resin (B) constituting an adhesive layer, in the above described water soluble coating liquid, with the result that proper protrusions are formed on a film surface of the adhesive layer.

In a case where a refractive index of the particles is different from that of a resin constituting an adhesive layer by 0.1 or more, it can be a cause for deteriorates transparency according to a particle size. As particles that can be used in the invention, there can be named: inorganic particles such as calcium carbonate, calcium phosphate, silica, kaolin, talc, titanium dioxide, alumina, barium sulfate, calcium fluoride, lithium fluoride, zeolite and molybdenum sulfide; and organic particles such as crosslinked polymer particles and calcium oxalate. Among them, silica is most preferably used since it has a refractive index comparatively close to that of a resin in an adhesive layer and can achieve high transparency of the layer with ease. It is preferable to use composite inorganic oxide particles with a higher refractive index than that of a resin constituting an adhesive layer and inorganic oxide particles with a lower refractive index than that of the resin constituting an adhesive layer. Such composite oxide particles are exemplified by alumina-silica composite oxide particles and composite oxide particles with a refractive index of the same order of that of the resin constituting an adhesive layer can be attained by optimize contents of alumina and silica as starting material.

An average diameter of particles (observed under an electron microscope) added to the water soluble coating liquid is preferably in the range of from 0.01 to 1.0 μm, or more preferably in the range of 0.02 to 0.5 μm, or most preferably in the range of from 0.03 to 0.1 μm. If an average diameter of inert particles is larger than 1.0 μm, a surface of an adhesive film is rough and the film tends to reduce transparency. On the other hand, if an average diameter of the inert particles is less than 0.01 μm, it is not preferable because of an insufficient slip property.

A content of inert particles in a coating layer (adhesive layer) measured after drying the applied coating liquid is preferably in the range of from 0.01 to 60% by weight, or especially preferably in the range of 0.1 to 40% by weight. If a content of the inert particles in the coating layer (adhesive layer) is larger than 60% by weight, adhesiveness to a base film has a chance to be lost. On the other hand, if a content of the inert particles is less than 0.01% by weight, it is not preferable since a slip property of the adhesive layer becomes insufficient.

In the invention, it is preferable to incorporate two kinds of particles (particles A and particles B) in an adhesive layer. An average diameter of the particles A is preferably in the range of from 20 to 300 nm, upper limit not being included or more preferably in the range of from 30 to 100 nm, upper limit not being included. If an average diameter of the particles A is less than 20 nm, a scratch resistance tends to be worsened. On the other hand, if an average diameter of the particles A is larger than 300 nm, a haze value tends to be higher.

A scratch resistance is insufficient only with putting the particles A in an adhesive layer. Therefore, in order to improve the scratch resistance, it is preferable to incorporate the particles B in the adhesive layer together with the particles A. An average diameter of the particles B is preferably in the range of from 300 to 1000 nm, or more preferably in the range of from 400 to 800 nm. If an average of the particles B is less than 300 nm, a scratch resistance tends to be degraded. On the other hand, if an average of the particles B is larger than 1000 nm, a haze value tends to be higher and a total light transmittance tends to be lower. Further, it is preferable that the particles B are composed of secondary particles each constituted of an agglomerate of original or primary particles and an average diameter ratio of in a agglomerated state to in a primary state is preferably set to 6 or more in terms of a scratch resistance on the surface of the adhesive layer.

Further, it is preferable that a content ratio (A/B) of the particles A to the particles B in the adhesive layer is set to a value in the range of from 5 to 30 and a content of the particles B is set to a value in the range of from 0.1 to 1% by weight based on a solid component of the adhesive layer as 100% by weight, since an optical-use adhesive film can be obtained in conditions that a haze value is small and a total light transmittance is low and in addition, such that not only a good slip property but a superior scratch resistance are achieved. Therefore, contents of both kinds of particles A and B are preferably set so as to fall in the above-described ranges. Especially, if a content of the particles B is larger than 1% by weight of a solid in an adhesive layer, a transparency is reduced with ease, which in turn reduces a total light transparency. The term "a solid" described in the context above means a sum of solids of a resin A, a resin B, the particles A and the particles B. It is preferable that two kinds of silica particles that are different from each other in terms of particle diameter, and particle shape are employed as inert particles incorporated in an adhesive layer: as the particles A, silica particles each being a sphere and individually dispersed and as the particles B, silica particles each being an agglomerated particle, wherein both kinds of the silica particles are respectively used in contents and ratio in the ranges described above. Further, it is especially preferable that when a coating amount is adjusted in the range described above with contents and ratio of the two kinds of silica particles set in the range above described therein, since an optical-use adhesive film can be achieved with a small haze value and a high total light transmittance and not only a good slip property but a superior scratch resistance.

A composition of the above described water soluble coating liquid may be incorporated with various kinds of additives such as an anti-static agent, an ultraviolet absorption preventive agent, an antibacterial agent, a plasticizer, pigment, organic and inorganic fillers and a lubricant. Furthermore, since a coating liquid is aqueous, other water soluble resins, water dispersible resins, emulsions and so on may be added to a coating liquid in order to improve a performance thereof in the range in which contributing effects of the additives are not lost.

Further, a catalyst may be added to an aqueous coating liquid employed in the invention as far as an adhesiveness is not lost in order to accelerate a thermal crosslinking reaction and for example, there can be employed: various kinds of chemical materials such as inorganic materials, salts, organic materials, alkaline materials, acidic materials and metal containing organic compounds. An alkaline material or an acidic material may be added in order to adjust pH of the aqueous solution.

In a case where the above described coating liquid is applied on a surface of a base film, a known anionic surface-active agent and a nonionic surface-active agent can be added in a necessary amount in order to increase wettability and make application of a coating liquid uniform. A solvent used in a coating liquid may be alcohols such as ethanol, isopropyl alcohol and benzyl alcohol in addition to water and a content thereof in a coating liquid may be less than 50% by weight based on a total weight of the coating liquid. Further, if the content is less than 10% by weight, any organic solvent other than alcohols may be dissolved in the range in which the solvent can be dissolved. However, a sum of weights of the alcohols and other organic solvents is preferably less than 50% by weight in the coating liquid.

When an added amount of an organic solvent is less than 50% by weight, not only is a drying property improved in a coating/drying operation, but an effect of betterment of appearance of a coating film is obtained as compared with a case where only water is used. If an added amount of an organic solvent is equal to or more than 50% by weight, a vaporizing speed of the solvent becomes fast, which in turn makes a change in concentration of a coating liquid occur during a coating operation with ease. As a result, a viscosity of the coating liquid is raised and a coatability is decreased, so that there unfavorably arises a risk to cause poor appearance of the coating film and further, liability to harm such as a fire increases and working environment for human health is deteriorated.

Further, a coating amount (a weight of a solid per a unit area of a film) of an adhesive layer is preferably in the range of from 0.05 to 0.50 g/m$^2$. If a coating amount is less than 0.05 g/cm$^2$, adhesiveness is insufficient. If more than 0.50 g/m$^2$, a total light transmittance is unfavorably reduced.

A total light transmittance of an optical-use adhesive film of the invention, is preferably equal to or more than 90%, more preferably equal to or more than 91%, or most preferably equal to or more than 92%. If a total light transmittance is less than 90%, it is not preferable since a sharpness of a screen picture is unfavorably reduced when the optical-use adhesive film is employed for base films of a touch panel and an anti-reflection film. In order to increase a total light transmittance of an adhesive film of the invention to be equal to or more than 90%, no particles for imparting a slip property are preferably incorporated in a base film as described.

Further, it is preferable that a haze value of an optical-use adhesive film is equal to or less than 1.0%, more preferably equal to or less than 0.8%, or most preferably equal to or less than 0.6%. If a haze value of an optical-use adhesive film is more than 2.0%, a sharpness of a screen picture is unfavorably reduced with ease when the film is employed for a lens film for LCD or an anti-reflection film for CRT.

An adhesive film is laminated on at least one surface of a biaxially oriented polyester film, which is a base film, in the invention. Adhesive layers may be laminated on both surfaces according to an optical application. As such an optical application in which adhesive films are used being laminated on both surfaces, there can be named: a base film for a touch panel, an anti-reflection film, a protective film in CRT and others.

In coating the coating liquid, it is preferable that there is provided a filter medium by which the coating liquid is preferably precision-filtered just before coating in order to eliminate particles in the coating liquid, coarse agglomerates produced by deposition in a resin or contaminant.

Furthermore, in order to set a total light transmittance of an optical-use adhesive film of the invention to a value equal to or higher than 90%, it is useful to remove foreign matter in a coating liquid and a base film and rapidly cool all unoriented sheet in its production (especially a surface that is not in contact with a chill roll).

A filter media for precision filtration of a coating liquid of the invention is preferably selected so that a filter particle size is equal to or less than 25 $\mu$m (at an initial filter efficiency of 95%). If a filter particle size is larger than 25 $\mu$m, neither coarse agglomerates nor contaminant can sufficiently be eliminated and many of the coarse agglomerates that have not been able to be eliminated are dispersed by a stretching force in a uniaxially stretching step following coating/drying operations or in a biaxially stretching step following coating/drying operations and sometimes recognized as agglomerates equal to or larger than 100 $\mu$m across in some instances, which produces an optical defects in addition to a penalty that a haze value of an optical-use adhesive film becomes higher.

A type of a filter medium for precision filtration is not specifically limited as far as the medium has a performance to eliminate the above described foreign matter but various kinds thereof can be named: filter media of a filament type, of a felt type and of a mesh type.

No specific limitation is put on material of a filter medium used in precision filtration for a coating liquid as far as the material of a filter medium has a performance to eliminate the above described foreign matter and gives no adverse influence on the coating liquid, but for example, the following materials are exemplified: stainless, polyethylene, polypropylene, nylon and so on.

Next, a production process for an optical-use adhesive film of the invention will be described taking polyethylene terephthalate (hereinafter referred to as PET) as an example of a biaxially oriented polyesterfilm, which is a base film, but a base film of the invention is naturally not limited to a PET film.

Pellets of PET that do not contain substantially inert particles are sufficiently vacuum dried and thereafter, the pellets vacuum dried are fed to an extruder. The melted PET is extruded, into a sheet at about 280° C. and cooled and solidified, thereby forming an unoriented PET sheet. In this process, high precision filtration is performed during a molten resin is kept at about 280° C. in order to eliminate foreign matter included in the resin. While a filter medium used in precision filtration for molten resin is not specifically limited, a filter medium made of sintered stainless is preferable since it has a superior removing ability of such agglomerates mainly containing Si, Ti, Sb, Ge and Cu as main components and organic material with a high melting point. The term "PET that do not contain substantially inert particles" means that a content of the inert particles in PET is less than the detection limit in measurement by a fluorescent X-ray analysis.

Further, a filter particle size of a filter medium (at an initial filter efficiency of 95%) is preferably equal to or less than 10 $\mu$m. If a filter particle size of the filter medium (at an initial filter efficiency of 95%) is equal to or more than 10 $\mu$m, foreign matter of 15 $\mu$m or more size cannot sufficiently be removed. While there arises a case where a productivity is reduced when high precision filtration of molten resin is performed by using a filter medium equal to or less than 10 $\mu$m or less as a filter particle size (at an initial filter efficiency of 95%), it is necessary and inevitable to adopt such a filter medium in order to achieve an optical-use film with small optical defects.

A well known method is normally adopted for cooling an unoriented sheet and the following method can be applied: a molten PET is extruded on a rotary cooling drum from a dice in the form of a sheet and the sheet-like melted PET is rapidly cooled to a solid sheet while keeping a close contact with the rotary cooling drum. Further, a method in which a air knife is used for handling, a method in which an electrostatic charge is applied to a sheet-like melted PET and other methods are preferably adopted, for example. Of the two methods, the latter method for applying an electrostatic charge is especially preferable in connection with uniformity of thickness.

As a method for cooling an air-side surface of the sheet, a well known method can be applied and the following methods are exemplified: a method in which a sheet surface is put in contact with a cooling liquid in a tank, a method in which a liquid that evaporates off is coated on a sheet air-side surface with a spray nozzle and a method in which a high speed air stream is blown for cooling, which may be adopted singly or in combination.

Even if there is a fine foreign matter that passes through a filter medium in a melt extrusion step, crystallization progresses around the foreign matter in the course of cooling of a sheet-like melt and results of the crystallization adversely affects stretching of the unoriented sheet in a stretching step described below so as to cause non-uniformity in stretching with ease which entails fine differences in thickness over a film. Incident light on a portion of the film where fine differences in thickness arise is refracted and scattered and as a result, a foreign matter included in the film is seen by the naked eye so as to be larger than actually. These fine differences in thickness can be observed as a height of a convex and a depth of a concave. When a height of a convex is equal to or higher than 1 $\mu$m and a depth of a concave is equal to or deeper than 0.5 $\mu$m, a composite of the convex and concave is recognized as a size equal to or larger than 50 $\mu$m by the naked eye though a composite size of the convex and concave are actually 20 $\mu$m and in some instances, the same composite of the convex and concave are recognized as an optical defect of equal to or larger than 100 $\mu$m as well. In order to obtain a high transparency film, it is desirable that a few particles or no particles are incorporated in a base film in order to achieve a high transparency film, whereas there is a tendency that as an added amount of particles is lesser and a transparency is higher, an optical defect caused by a fine convex/concave combination tends to be more distinct.

Further, since a thicker film is more difficult to rapidly cool across the entire thickness of a film than a thinner film and promotes crystallization and thus nonuniform drawing, it is effective to cool an air-side surface in an unoriented sheet production. As a cooling method for an unoriented sheet, there can be applied a well known method in which molten resin is extruded on a rotary cooling drum (chill roll) from a dice in the form of a sheet and the sheet-like melt is rapidly cooled to a solid sheet while keeping a close contact on the chill roll. A method for cooling an air-side surface (surface opposite to the surface in contact with a chill roll) of the sheet-like film, there can be exemplified: a method in which a sheet surface is put in contact with a cooling liquid in a bath, a method in which a liquid that evaporates off is coated on a sheet air-side surface with a spray nozzle and a method in which a high speed air stream is blown on an air-side surface for cooling. Among them, the high speed air stream method is effective. Especially when a thick optical-use film of a thickness equal to or more than 188 $\mu$m is produced, the high speed air stream method is preferably applied on a film on chill roll. Further, in order to keep a sheet-like melted PET in close contact on a chill roll, a method in which an air knife is used for handling a sheet-like melted PET, a method in which an electrostatic charge is applied and other methods are preferably adopted, for example. Of the two methods, the latter method for applying an electrostatic charge is especially preferable.

The resultant undrawn sheet is drawn at a draw ratio of from 2.5 to 5.0 times in the longitudinal direction by a roll heated at a temperature in the range of from 80 to 120° C. Longitudinal draw may be performed in one step of operation, but two or more step draw in longitudinal draw can be applied in connection to productivity and reduction in thickness variation.

Then, the film held by a clip at an end thereof and guided to a hot air zone heated at 80 to 180° C., where the film is drawn at a draw ratio 2.5 to 5.0 times in the transverse direction. The film is further guided to a hot air zone heated at 160 to 240° C., where the film is heat-treated for 1 to 60 seconds. Thus, crystal orientation is completed. Optionally, the film can be relaxed at 1 to 12% in the transverse direction and/or longitudinal direction during the heat-treatment process. In addition, when a film is cooled to a temperature equal to or lower than Tg after thermo-setting, it is preferable to provide a nip roll or a rapid cooling zone to cut a tension since a thermo-setting effect is decreased if the tension is acted along a film running direction.

At any stage in the course of this step, an aqueous coating liquid including the water soluble copolymerized polyester (A) and the polyurethane-based resin (B) is applied on one surface of the PET film or on both surfaces thereof.

Application of the aqueous coating liquid can be performed any one of well known methods: for example, a reverse roll coating method, a gravure coating method, a kiss-roll coating method, a roll brush method, a spray coating method, a air knife coating method, a wire bar coating method, a pipe doctor method, an impregnation/coating method, a curtain flow coating method and others. The methods can be employed, single or in combination.

A step of applying the aqueous coating liquid may be a normal coating step, that is an off-line step of applying the coating liquid on a base film that has been biaxially stretched and thermo-set, but a preferable method is an in-line coating method in which the coating liquid is applied on the base film in the making. Further, the liquid is more preferably applied on a base film prior to crystal orientation. In a case where the coating liquid is applied on an unoriented polyester film or a polyester film that has been uniaxially stretched and thereafter, the film is dried and stretched, it is important that a temperature and a time length are selected in a drying step following the coating step such that only a solvent such as water is removed but no crosslinking reaction in a coating layer progresses. A drying temperature is preferably in the range of from 70 to 140° C. and a drying time is adjusted according to a kind of a coating liquid and a coating amount, while it is preferable to set a product of a temperature (in ° C.) and a time (in sec) to a value in the range of from 1000 to 3000.

A solid concentration in an aqueous coating liquid is preferably equal to or less than 30% by weight, or especially preferably equal to or less than 10% by weight. An aqueous coating liquid is applied on a film so as to be attachment in the range of from 0.04 to 5 g per 1 $m^2$ of a film, or preferably in the range of from 0.2 to 4 g per 1 $m^2$ of a film. A film that has been applied with the aqueous coating liquid and the attachment thereof on which has been dried is guided into a tenter for stretching and thermo-setting, and the film is heated in the tenter to form a more stable coat through a thermal crosslinking reaction, thereby entailing a polyester-based laminated film. In order to acquire good adhesiveness in prism lens processing, hard coat processing and anti-reflection processing and furthermore, in order to attain good wettability with ink, it is preferable to heat a polyester-based laminated film at a temperature equal to or higher than 100° C. for a time period equal to 1 min or longer in the heat treatment step and further, to adjust a coating amount of an adhesive layer after the heat treatment step to be equal to or more than 0.05 g/$m^2$.

An optical-use adhesive film of the invention preferably has a difference between the maximum and minimum of a longitudinal thermal shrinking ratio along a transverse direction at a value equal to or less than 0.2%, more preferably equal to or less than 0.1%, or most preferably equal to or less than 0.06%. In order to reduce a difference between the maximum and minimum of a longitudinal thermal shrinking ratio along a transverse direction to a value equal to or less than 0.2%, it is preferable to adjust a temperature distribution of the film in the thermo-setting zone such that a temperature is raised from the middle portion toward the ends along a film transverse direction.

Detailed description of a preferred structure will follow: As shown in FIG. 1, plenum ducts 1 (supply openings 2 for hot air) are disposed one above the other at constant distances between adjacent ducts as viewed from a film running direction and baffle plates 3 are respectively placed on the supply openings 2 in the middle of the ducts 3 such that a length of a baffle plate 3 is increased along the film running direction: a total effective length of a supply opening 2 of a plenum duct 3 is narrowed along the film running direction. With such a structure, an air volume distribution along a transverse direction is raised from the middle portion toward the ends of the supply opening 2 with the result that a temperature distribution of the film along a transverse direction is also raised from the middle portion toward the ends of the film in the transverse direction. Alternatively, an infrared heater may be used instead, wherein the same temperature distribution in a transverse direction of the film is achieved by controlling thermal energy distribution irradiated to the film.

The inventors uncovered that a conventional biaxially stretched PET film was run in a post-processing step while specific distributions of temperature and tension are imparted on the film and after the running of the film, the film that was laid on a planar surface was found in a state in which one side end portion of the film was loosened. This is believed because when the film was heated under tension applied thereon in a post-processing step, there are a difference between longitudinal thermal shrinking ratios on both ends in the transverse direction and thereby, the one end is not applied with a tension, leading to looseness.

Even when an effort is extended to eliminate such looseness by applying an excessively large tension to the side end of looseness, such an effort ends up accumulating an implicit strain in the bulk of an optical-use adhesive film due to stretching of the film caused by heat in a processing step, while when the strain comes evident after completion of the film process, thereby reducing a quality of products such as a prism lens, a hard coat applied product and an anti-reflection film applied product.

Therefore, the inventors continued serious studies and discovered that a strain produced in an optical-use adhesive film had a distribution in a transverse direction of the film in a tenter and the strain was increased in the transverse direction on the film from the middle portion toward both ends thereof. The reason why is believed that both end portions have larger strains since the film is tension-held with clips at ends and thereby both end portions are harder to be deformed. As a result, a longitudinal thermal shrinking ratio changes along a transverse direction, which comes apparent as looseness when in a heat treatment of a post-processing step. The above-described strain can be reduced by raising a temperature in thermo-setting processing of an optical-use adhesive film production and a strain distribution along a transverse direction can be uniform by raising a temperature from the middle portion toward both side ends of the optical-use adhesive film.

In order to suppress generation of the looseness, it is necessary to decrease a difference in longitudinal thermal shrinking ratio between both ends of a slit roll at any point along a transverse direction when the film is slit from a mill roll into a product width of a customer. In description in a concrete manner, it is necessary to suppress a difference between the maximum and minimum of a longitudinal thermal shrinking ratio at both ends along a transverse direction of the optical-use adhesive film to a value equal to or less than 0.2%. With the difference equal to or less than 0.2, post processing can be effected in the step thereof with no excessive tension. Further, the optical-use adhesive film can be transported with no rubbing with a frame of a machine base or other parts in its running in a post-processing step by slacking down of the film at one end.

Further, in an optical-use adhesive film of the invention, it is preferable that a warpage is equal to or less than 3 mm for a film specimen of a size of 300 mm×210 mm when the film is heated at 150° C. for 3 hr. The inventors discovered that if a thermal shrinking ratio of a plastic film is suppressed to a value, a warpage could be decreased to be small.

In order to suppress a warpage of a film specimen of a size of 300 mm×210 mm to a value equal to or less than 3 mm when the film specimen is heated at 150° C. for 3 hr, it is preferable that a thermal shrinking ratio after an optical-use adhesive film of the invention receives a heat treatment at 150° C. for 3 hr is equal to or less than 0.2% in either of transverse (TD) and machine(MD) directions. If a thermal shrinking ratio is larger than 0.2%, a warpage is apt to be equal to or more than 3 mm. While there is no specific limitation on a method to suppress a thermal shrinking ratio to a value equal to or less than 0.2%, it is preferable, for example, that a temperature-time product Σ(temperature× time) in a zone at a temperature equal to or higher than 150° C. of a thermo-setting zone during polyester film production is increased in conditions that a film forming property and a quality of the film are not poor and a relax treatment (temperature and a relax ratio) along a transverse direction is set to an appropriate level. Further, a relax treatment (temperature) along a longitudinal direction may also be adopted together with that along a transverse direction. Besides, an off-line heat treatment (temperature and time) after film production is also effective.

A temperature of thermo-setting in an in-line treatment is preferably in the range of from about 220 to about 240° C. In a temperature equal to or lower than 220° C., an effect of reducing a size contraction ratio after a heat treatment is insufficient. On the other hand, at a temperature higher than 240° C., a stable film formation of a plastic film is hard to be realized. Furthermore, it is preferable to provide a nip roll and a rapid cooling zone in order to cut an action of a tension when a film is cooled to a temperature equal to or lower than Tg after the thermo-setting, since an effect of thermo-setting is diminished if a tension is imparted on the film along a film running direction.

As a method for a relaxation treatment (TD relax) along a transverse direction, a distance between clips to keep both ends of the film is preferably relaxed by the order in the range of from 3 to 10% of its original width at a temperature in the range of from 70 to 220° C. In a temperature lower than 70° C., the effect of reducing a size contraction ratio after a heat treatment is insufficient. On the other hand, at a temperature higher than 220° C., a stable film formation of a plastic film is hard to be realized. Further, if a relaxation ratio along a transverse direction is less than 3%, an effect of a heat treatment is insufficient and if more than 10%, poor planarization of a film and a flaw on the film occur with ease.

If after a film is formed, the film is subjected to a heat treatment at a temperature in the range of from 180 to 200° C. while untake-up the film in an off-line operation, thermal shrinking ratios along the MD and TD directions are easier to be each controlled to a value equal to or less than 0.2%. In the operation, it is important that a film running speed on the take-up side is made a little slower than that on the film feed side in accordance to thermal shrinking ratio of a plastic film.

A thickness of an optical-use adhesive film of the present invention thus obtained is preferably set to a value in the range of from 50 to 300 μm, more preferably in the range of from 100 to 250 μm, or most preferably in the range of from 125 to 250 μm. If a film thickness is less than 50 μm, stiffness is unfavorably insufficient. On the other hand, if more than 300 μm, it is unfavorable since foreign matters which are observed as optical defects in the film increase and a total light transmittance is thereby decreased.

Besides, the present invention provides a biaxially oriented polyester film that is good in roll appearance after the film are wound on a core reel and in addition, a film roll can be obtained such that a quality and a grade of whose film are retained for a long term. As likes an optical-use adhesive film of the invention is good in roll appearance after the film are wound on a core reel and in addition, a film roll can be obtained such that a quality and a grade of whose film are retained for a long term.

Conventionally, when a film is produced as a roll-like product by taking-up the film, protrusions are formed on a film surface by normally mixing inorganic or organic fine particles in a raw material resin, or applying a fine particle containing layer by coating. This surface protrusions play a role to release air in the roll that would be wound in the film roll and which is supplied by air stream accompanying the film in the running when the film is taken up on a core reel. However, a biaxially oriented polyester film in recent years has come to have more of chances to be used for replacement of glass and in optical products associated with liquid crystal related applications, entailing very strong demands for surface smoothness and transparency in recent years. In order to satisfy such demands, a content of fine particles tends to decrease.

If a content of fine particles decreases, however, insufficient protrusions are resulted. Hence, when a film is taken-up on a core reel, the accompanying stream can not be rejected, misplacement between turns occurs and more of air is locally wound in a gap between film turns, which adversely works on a product yield so as to decrease to its extremity. Further, when a film surface is smooth, scratches are also easy to be unfavorably formed on a film surface by frictional rubbing between films.

In order to avoid the above-described problems in the prior art, a method has been known in which concaves/convexs or protrusions are formed in end portions of a film and such a film is taken up on a core reel. For example, such a method has been disclosed in JP 92-85248 A, JP 92-85249 A and JP 97-124199 A. According to the techniques disclosed in the prior art documents, arrangement of the concaves/convexes or protrusions is properly set in arrangement directions thereof or distances there between, thereby releasing air wound in gaps between turns of the film in a film take-up step, which air is part of an accompanying air stream, and preventing misplacement between turns of the film on the core reel or the like from occurring.

With only the technique applied, however, there has sometimes been arisen a problem since, while good roll appearance is obtained immediately after the take-up, air is gradually released from the roll over a long time that elapses, so that take-ups of the films on the core reel are tightened to deteriorate its planarity and, especially in a case of a biaxially oriented polyester whose surfaces are especially flat and smooth, scratches by mutual contacts between films or the like occur. Especially, occurrence of the problem has been conspicuous in a film of a comparatively large thickness. A film role has a chance to be stored for a long term in a distribution channel and in the case, a quality of the film roll has not been able to be guaranteed over a long term with only a conventional technique.

The inventors has discovered, as a result of serious studies that have been made in light of actual circumstances, facts that, in take-up of a film that is already subjected to emboss processing in both end portions along a transverse direction, there is used a film that has been processed such that a ratio of a sum of vertical projection areas on a film surface of the optical-use adhesive film of portions thereof deformed by emboss processing, to a total area of the optical-use adhesive film with which the emboss-processing roll is put into contact is in the range specified in the invention and thereby a film roll can be attained such that an amount of air that is wound in the film roll is properly adjusted, a roll appearance immediately after the film take-up is good; a proper air amount once wound into between film take-ups is retained and a good roll appearance is also sustained even after a long term elapses, whereby neither deterioration of planarity nor scratching occur. According to such an optical-use adhesive film, there can be achieved a film roll having a good appearance in take-up, whose quality and grade are maintained for a long time.

Below, detailed description will be made of the optical-use adhesive film.

In the optical-use adhesive film, it is necessary that a ratio (protrusion area ratio) of a sum of vertical projection areas on a film surface of the optical-use adhesive film of portions thereof deformed by emboss processing, to a total area of the optical-use adhesive film with which the emboss-processing roll is put into contact is in the range of from 0.01 to 0.25. If a protrusion area ratio is less than 0.01, it is unfavorable since disturbance in planarity of a film is worsened in a long term storage of a roll of the film and scratches are generated on a film surface. On the other hand, if more than 0.25, it is also unfavorable since a disturbance in planarity of a film is worsened in a stage immediately after a film is taken-up, thereby generating scratches on a film surface.

A vertical projection area on a film surface of the optical-use adhesive film of any one portion thereof deformed by emboss processing (hereinafter referred to as a single protrusion area) is preferably in the range of from 0.01 to 0.2 $mm^2$ in connection with an air retaining property. If a single protrusion area is less than 0.01 $mm^2$, it is unfavorable since disturbance in planarity of a film is worsened with ease when the film roll is stored for a long term and thereby, scratches are also generated on a film surface with ease. On the other hand, if a single protrusion is beyond 0.2 $mm^2$, it is also not preferable since disturbance in planarity of a film is worsened with ease in a stage immediately after a film is taken-up and thereby, scratches are generated with ease on a film surface.

Further, in order to attain a good balance between an rejecting property and a retaining property of air wound-in, an average height (X) of deformed portions on a film surface of the optical adhesive film caused by emboss-processing is preferably in the range of from 1 to 20% of an average thickness (Y) of a non-processed region. More preferably, the average height (X) is in the range of from 2 to 18%. If Y/X is less than 1%, it is not preferable since scratches are generated with ease immediately after the film is taken-up. On the other hand, if Y/X is larger than 20%, disturbance in planarity of the film is worsened with ease over a long term of storage.

Furthermore, it is preferable that an average film thickness in a non-processed region is in the range of from 30 to 300 μm and an average height of deformed portions generated by deformation of a film caused by the emboss-processing is in the range of from 3 to 30 μm. If the average thickness is less than 30 μm or the average height is less than 3 μm, scratches are unfavorably generated with ease immediately after the film is taken-up. On the other hand, if the average thickness is larger than 300 μm or the average height is larger than 30 μm, disturbance in planarity is unfavorably worsened in a long term storage.

Besides, a film width that is emboss-processed is preferably in the range of from 5 to 20 mm from the viewpoint of a rejecting property and a retaining property of air wound-in.

With introduction of a take-up step for a film of the invention, a film roll can be attained such that a proper fraction of air that is wound-in from an accompanying stream when the film is taken-up is rejected and an optimal amount of an air layer is included in the interior of a film roll. Besides, since an air layer is retained after a long term storage as well, not only can a good appearance of the film roll be maintained over a long term, but no generation of scratches or the like occurs.

Figure 3:
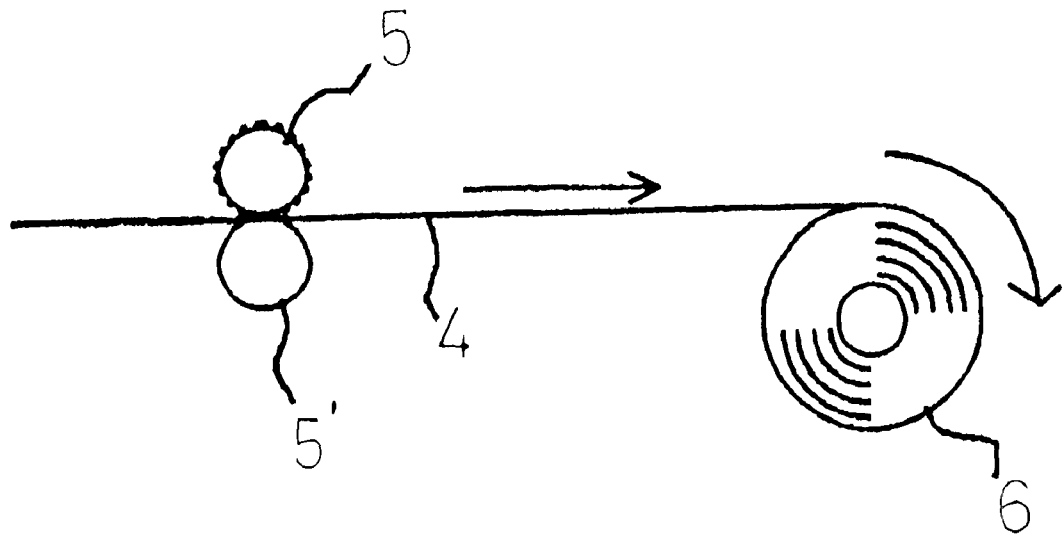
FIG. 3 is a schematic side view showing a way that a film receives emboss processing.

Below, description will be made of preferred embodiments of the invention. FIG. 3 schematically shows a way that emboss-processing is applied on side end portions of an optical-use adhesive film. A numerical mark 4 indicates an optical-use adhesive film that continuously runs, 4 indicates an emboss-processing roll, 5' indicates a back-up roll and 6 indicates a film roll of an optical-use adhesive film wound up. The emboss-processing roll 5 is preferably a metal roll on whose outer surface many of protrusions are formed and more preferably the metal roll on whose outer surface hardening processing (for example nitriding processing) is applied. Further, the back-up roll 5' is a planar roll, whose material preferably a metal, and on whose surface rust preventing processing (for example, hard chromium plating) is applied.

Further, the emboss-processing roll 5 and the back-up roll 5' are arranged in an opposite manner and each desirably have a structure that is operated by air cylinder. Further, both of the rolls 5 and 5' can impart the optical-use adhesive film 4 protrusions thereon by nipping the film.

Figure 4:
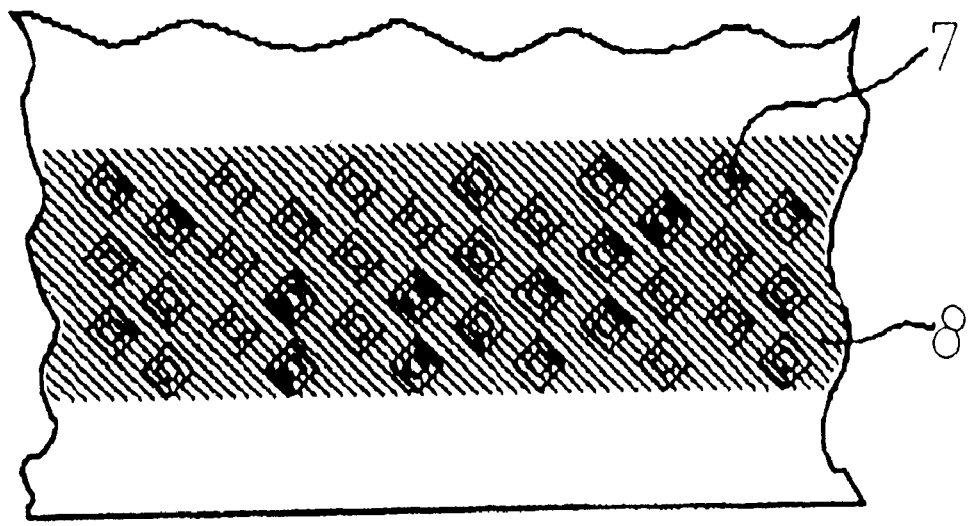
FIG. 4 is a schematic enlarged plan view showing an emboss-processed region.

FIG. 4 is a schematic enlarged view showing an emboss-processed portion. In FIG. 4, 7 indicates a portion of a film where the film is deformed by the emboss-processing and 8 indicates a portion of the film with which an emboss-processing roll is put into contact.

In order to realize the state of protrusions shown in FIG. 4, either of the following methods may be used to realize: a method in which a size and shape of each protrusion of the emboss-processing roll and a distance between protrusions are properly selected and another method in which a processing pressure is properly set.

EXAMPLES

Following is a description of a production process for an optical-use adhesive film of the invention in which a PET film, as an example, is employed as a base film, but it is natural that there is no specific limitation to the base film. Further, the terms "part" and "%" used in examples and comparative examples are both those expressed by weight unless otherwise specified.

Example 1

(1) Preparation of Coating Liquid

A coating liquid used in the invention was prepared according to the following process. Ninety five parts of dimethylterephthalate, 95 parts of dimethylisophthalate, 35 parts of ethyylene glycol, 145 parts of neopentyl glycol, 0.1 part of zinc acetate and 0.1 part of diantimony trioxide were put into a reaction vessel and transesterification was performed at 180° C. for 3 hr. Following the transesterification, 6.0 parts of 5-sodium isophthalate was added to the reaction mixture and esterification was performed at 240° C. for 1 hr. After the esterification, condensation polymerization was performed at 250° C. for 2 hr under a reduced pressure in the range of from 13 to 0.3 hPa to obtain a polyester resin (A) of a molecular weight of 19500 and with a softening point of 60° C.

A 30% aqueous dispersion of thus obtained polyester resin (A) in 6.7 parts, 40 parts of a 20% aqueous solution of a self-crosslinked polyurethane resin (B) having isocyanate groups blocked by sodium bisulfite (made by Dai-ichi Kogyo Seiyaku Co., a trade name of Elastron H-3), 0.5 part of Elastron catalyst (made by Dai-ichi Kogyo Seiyaku Co., a trade name of Cat 64), 47.8 parts of water and 5 parts of isopropyl alcohol are mixed to form a mixture and furthermore, 0.6 part of a 10% aqueous solution of an anionic surface active agent and 1.8 parts of a 20% aqueous solution of colloidal silica particles (made by Nissan Kagaku Kogyo Co., a trade name of Snowtex OL) were added to the mixture to form a coating liquid (hereinafter referred to as a coating liquid AB-1).

(2) Production of Adhesive Film

Pellets of polyethyleneterephthalate resin virtually having none of inert particles, whose intrinsic viscosity is 0.62 dl/g as a film starting material were dried at 135° C. for 6 hr under reduced pressure of 1.3 hPa. After the vacuum drying, the pellets were supplied to an extruder and a melt sheet was extruded at about 280° C. to rapidly cool/solidify on a metal roll kept at a surface temperature of 20° C. and obtain a casting film having a thickness of 1400 μm.

At this time, a sintered stainless filter medium of a filter particle size (at an initial filter efficiency of 95%) 10 μm was used as a filter medium for removal foreign matter in the molten resin. Then, the casting film was heated by means of a heated roll group and an infrared heater to 100° C. and thereafter, the casting film was draw in a longitudinal direction at a draw ratio of 3.5 times by using a roll group whose rolls have different circumferential speeds to obtain a uniaxially oriented PET film.

After obtaining the uniaxially oriented PET film, the coating liquid was precision-filtered with a felt type polypropylene filter medium of a filter particle size (at an initial filter efficiency of 95%) 25 μm and the coating liquid was applied on one surface of the uniaxially oriented PET film by means of a reverse roll method and a layer of the coating liquid on the uniaxially oriented PET film was dried. A coating amount (a solid weight) at this time was 0.07 g/m$^2$. Following the coating, the film was held at side end portions by clips and guided to a hot air zone, where the film was dried. Then, the film was drawn in the transverse direction at a draw ratio of 4.0 times at 130° C. The film was thermally fixed at 240° C., and relaxed at 3% in the transverse direction at 200° C. Thus, an optical-use adhesive film having a thickness of 100 μm was obtained.

Example 2

An optical-use adhesive film was obtained in a process similar to Example 1 with the exception that in Production of Adhesive Film of Example 1(2), a thickness of the casting film is set to 1750 μm and a thickness of a film after the film production was set to 125 μm.

Example 3

An optical-use adhesive film was obtained in a process similar to the Example 1 with the exception that in Production of Adhesive Film of Example 1(2), a thickness of the casting film is set to 700 μm and an coating amount (a solid weight) of a coating liquid is set to 0.10 g/m$^2$ and a thickness of a film after the film production was set to 50 μm.

Comparative Example 1

An optical-use adhesive film of a thickness of 100 μm was obtained in a process similar to Example 1 with the exception that in Preparation of Coating Liquid of Example 1 (1), a 30% aqueous dispersion of the polyester resin (A) in 33.5 parts, 47.8 parts of water and 18.7 parts of isopropyl alcohol are mixed to form a mixture and furthermore, 0.6 part of a 10% aqueous solution of an anionic surface active agent, 1.8 parts of a 20% aqueous solution of colloidal silica particles (made by Nissan Kagaku Kogyo Co., a trade name of Snowtex OL) were added to the mixture to form a coating liquid (hereinafter referred to as a coating liquid A-1).

Comparative Example 2

An optical-use adhesive film of a thickness of 100 μm was obtained in a process similar to Example 1 with the exception that in Production of Adhesive Film of Example 1(2), a thickness of the casting film is set to 1120 μm and a draw ratio in a longitudinal direction of the casting film is set to 2.8 times.

Evaluation Method

The optical-use adhesive film obtained in the examples 1 to 3 and the comparative examples 1 and 2 were evaluated on the following evaluation (1). The evaluation results are shown in Table 1.

(1-1) Measuring Method for Refractive Index of Base Film (a) Refractive Index of Base Film A measurement was performed in conformance with JIS-K7105 and Abbe's refractometer (made by K.K. Shimazu Seisaku-sho, 3L type) was employed in the measurement.

(b) Refractive Index of Adhesive Layer

Elipsometer (AEP-100B, made by K.K. Shimazu Seisaku-sho) was employed for measurement.

(1-2) Measurement of Haze Value of Optical-use Adhesive Film

Measurement was performed in conformance with JIS-K7105 using a haze meter (made by Tokyo Denshoku Kogyo Co., Model TC-H3DP).

(1-3) Measurement of Total Light Transmittance of Optical-use Adhesive Film Measurement was performed in conformance with JIS-K7105 using a haze meter (made by Tokyo Denshoku Kogyo Co., Model TC-H3DP).

(1-4) Measurement of Thickness Variation Ratio of Optical-use Adhesive Film Measurements were performed over a length of 1 m on a film along a longitudinal direction using an instrument made by Anritsu Denki K.K. in a continuous manner and a thickness variation ratio was obtained from the following formula:

Thickness variation ratio (%)=[(the maximum thickness−the minimum thickness)/an average thickness]×100

(1-5) Adhesiveness to Photo-Curable Acryl-Based Coating Layer

A hard coating agent made by Dainichi Seika Co. (Seika Beam EXFO1(B)) was applied on the surface of an adhesive layer of each of the optical-use adhesive films obtained in the examples and the comparative examples using a #8 wiper and after the coating, the coat was dried at 70° C. for 1 min to remove a solvent. After the removal of the solvent, a hard coating layer of a thickness of 3 μm was formed under irradiation with a high pressure mercury lamp of an illuminance of 200 mJ/cm² in conditions of an illumination distance of 15 cm and a running speed of 5 m/min. An adhesiveness was measured on an obtained film by means of a testing method in conformance with the description of section 8.5.1 of JIS-K5400. In description in a concrete manner, cuts were formed in a matrix structure including 100 squares using a cutter guide having clearance lengths each of 2 mm so as to reach to a depth same as a thickness of the adhesive layer. A cellophane pressure sensitive adhesive tape (made by Nichi Ban Co., of 24 mm width) was applied on a surface on which the cuts are formed and the cellophane tape was pressed on an optical strong-adhesive films with an eraser rubber while rubbing to complete adhesion and thereafter, the cellophane tape was peeled off at a right angle to the film surface and an adhesiveness was measured by the naked eye from the following formula:

Adhesiveness (%)=(1−a peel area/a test area)×100, wherein in the table, an adhesiveness equal to or larger than 90% is indicated with ○ and an adhesiveness less than 90% is indicated with X.

TABLE 1

| item | thickness of base film (μm) | kind of coating liquid | coating amount (g/m²) | refractive index of base film (longitudinal/Nx) | refractive index of base film (transverse/Ny) | refractive index of adhesive layer (Nc) | value of equation (1) | haze (%) | total light transmittance (%) | thickness variation ratio (%) | adhesiveness |
|---|---|---|---|---|---|---|---|---|---|---|---|
| Example 1 | 100 | AB-1 | 0.07 | 1.65 | 1.68 | 1.58 | 0.0149 | 0.5 | 91.6 | 1.7 | ○ |
| Example 2 | 125 | AB-1 | 0.07 | 1.66 | 1.68 | 1.58 | 0.0164 | 0.6 | 91.1 | 1.6 | ○ |
| Example 3 | 50 | AB-1 | 0.07 | 1.64 | 1.70 | 1.57 | 0.0218 | 0.9 | 91.1 | 2.2 | ○ |
| Comparative Example 1 | 100 | A-1 | 0.07 | 1.65 | 1.69 | 1.54 | 0.0346 | 1.3 | 88.7 | 1.7 | x |
| Comparative Example 2 | 100 | AB-1 | 0.07 | 1.50 | 1.70 | 1.58 | 0.0208 | 0.9 | 90.4 | 5.2 | ○ |

It is recognized from Table 1, an optical-use adhesive film of the invention is comprised of a base film and an adhesive layer, respectively with predetermined refractive indexes, and is excellent in transparency and adhesiveness, and in addition has a small thickness variation ratio.

Next, there is shown an example of an optical-use adhesive film of the invention in which transportability in a heat treatment of a post-processing step.

Example 4

(1) Production of Adhesive Film

Pellets of polyethylene terephthalate resin virtually having none of inert particles and whose intrinsic viscosity is 0.62 dl/g as a film starting material were dried at 135° C. for 6 hr under reduced pressure of 1.3 hPa. After the vacuum drying, the pellets were supplied to an extruder and a melt sheet was extruded at about 280° C. to rapidly cool/solidify on a chill roll kept at a surface temperature of 20° C. and obtain a casting film having a thickness of 1400 μm.

At this time, a sintered stainless filter medium of a filter particle size (at an initial filter efficiency of 95%) 15 μm was used as a filter medium for removal foreign matter in the molten resin. Then, the casting film was heated by means of a heated roll group and an infrared heater to 100° C. and thereafter, the casting film was drawn in the longitudinal direction at a draw ratio of 3.5 times by using a roll group whose rolls have different circumferential speeds to obtain a uniaxially oriented PET film.

After obtaining the uniaxially oriented PET film, the coating liquid AB-1 prepared in Example 1 (1) was precision-filtered with a felt type polypropylene filter medium of a filter particle size (at an initial filter efficiency of 95%) 25 μm and the coating liquid was applied on both surfaces of the uniaxially oriented PET film by means of a reverse roll method. Following the coating, the film was held at side end portions of the film were held by clips and the film was dried in a preheat zone of a tenter at 80° C. for 20 sec. Subsequent to the drying, the film was drawn in the transverse direction at a draw ratio of 4.0 times at 130° C. Then the film was thermally fixed transverse at 230° C., and relaxed at 3% in the transverse direction at 200° C. Thus an optical-use adhesive PET biaxially oriented film was obtained. A coating amount after drying of the obtained optical-use adhesive film was 0.10 g/m².

Further, a thermo-setting zone had a configuration in which plenum ducts, each of which extends along a film transverse direction, as shown in FIG. 1 were arranged along a film moving direction with two ducts as one set, one above the other, at a distance between any two adjacent duct pair of 400 mm, and hot air was blown onto an optical-use adhesive film from the upper and lower plenum ducts. In the example, a baffle plate was placed in the middle portion (in a film transverse direction) of the opening of a plenum duct to cover part of the opening and a length of a baffle plate was gradually increased along the film moving direction. That is, an air volume blown to the film became stronger at both ends of a duct along the film moving direction as an effective opening area of a plenum duct was narrower along the film moving direction. In description in a detailed manner, a length of a baffle plate changes such that an air volume at a duct opening close to the entrance of the thermo-setting zone was set at 20 m/sec and an air volume at a duct close to the exit was set at 40/sec, which was the highest in the heat thermo-setting zone.

Example 5

An optical-use adhesive film was obtained in a process similar to Example 4 with the exception that a thickness of a casting film was set to 1750 μm and a film thickness after the film production process was over was set to 125 μm.

Example 6

An optical-use adhesive film was obtained in a process similar to Example 4 with the exception that a thickness of a casting film was set to 2632 μm, a film thickness after the film production process was over was set to 188 μm and the casting film was cooled by blowing a high speed air stream onto an air-side surface (opposite to a surface in contact with a chill roll) of the film.

Example 7

An optical-use adhesive film was obtained in a process similar to Example 4 with the exception that a thickness of a casting film was set to 3500 μm, a film thickness after the film production process was over was set to 250 μm and the casting film was cooled by blowing a high speed air stream onto an air-side surface (opposite to a surface in contact with a chill roll) of the film.

Comparative Example 3

Figure 2:
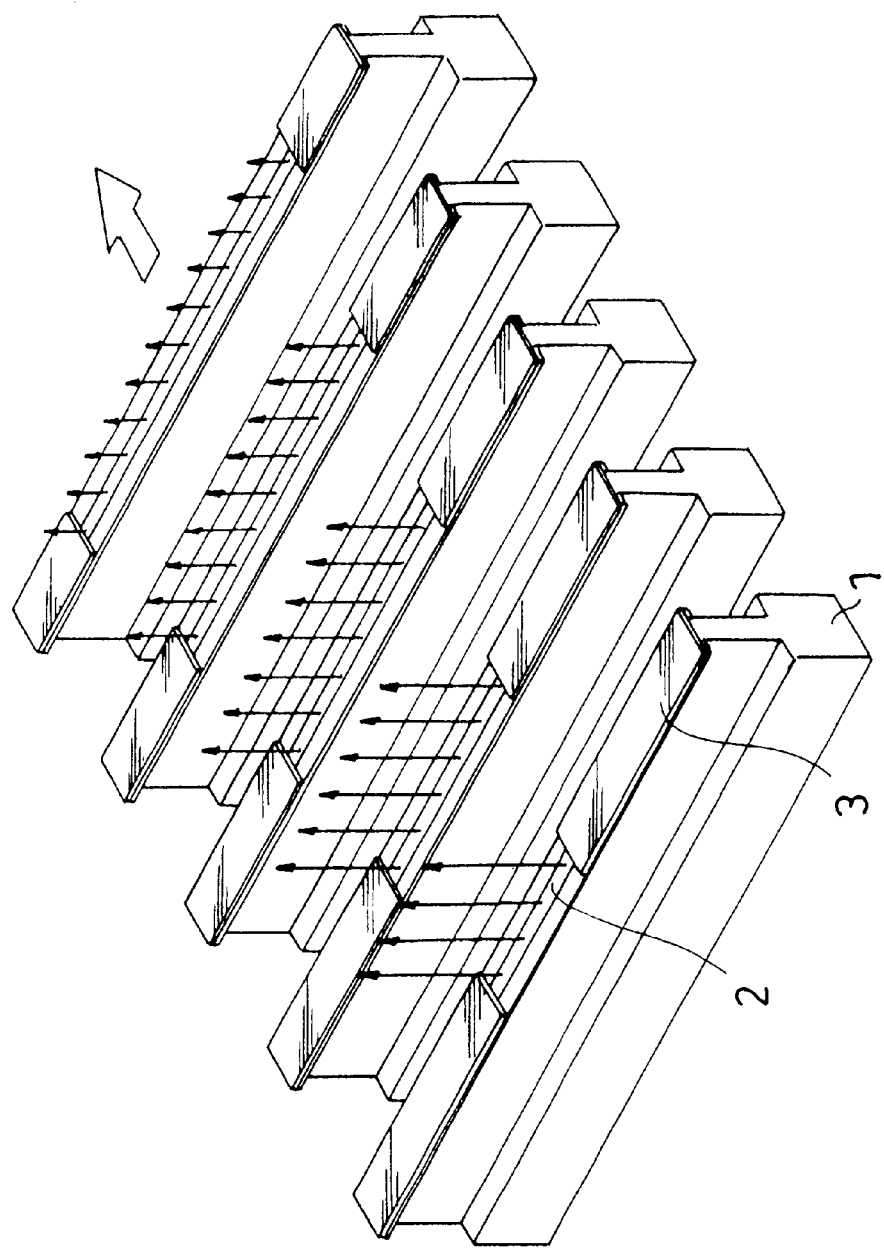
FIG. 2 is a perspective view of a state in which an optical-use adhesive film is thermo-set while part of an opening of each of plenum ducts is closed.

An optical-use adhesive film was obtained in a process similar to Example 4 with the exception that in Example 4, the coating liquid AB-1 prepared in Example 1(1) is replaced with the coating liquid A-1 prepared in Comparative Example 1; a thickness of a casting film was set to 1750 μm; a film thickness after the film production process was over was set to 125 μm; as shown in FIG. 2, a width of each of baffle plates as a set, two of which, as a pair, are placed on the opening of a plenum duct at both ends thereof, was gradually narrower along a film moving direction such that an air volume decreases from the middle portion toward both ends of the duct contrary to Example 1.

Comparative Example 4

An optical-use adhesive film was obtained in a process similar to Example 4 with the exception described below: The coating liquid AB-1 prepared in Example 1(1) was replaced with a coating liquid (hereinafter referred to as coating liquid B-1), which was prepared according to the following procedure: A 20% aqueous solution of self-crosslinked polyurethane resin (B) having isocyanate groups blocked by sodium bisulfite (made by Dai-ichi Kogyo Seiyaku Co., a trade name of Elastron H-3) in 50 parts, 0.5 part of Elastron catalyst (made by Dai-ichi Kogyo Seiyaku Co., a trade name of Cat 64), 37.8 parts of water and 11.7 parts of isopropyl alcohol are mixed to form a mixture and furthermore, 0.6 part of an anionic surface active agent, 1.8 parts of 10% aqueous solution of spherical colloidal silica particles (made by Nissan Kagaku Kogyo Co., a trade name of Snowtex OL) were added to the mixture to form the coating liquid. Further exception was such that a thickness of a casting film is set to 1750 μm, a film thickness after the film production process was over was set to 125 μm and a width of each of baffle plates as a set, two of which, as a pair, are placed on the opening of a plenum duct at both ends thereof, was gradually narrower along a film moving direction such that an air volume decreases from the middle portion toward both ends of the duct contrary to Example 4.

Referential Example 1

An optical-use adhesive film was obtained in a process similar to Example 4 with the exception that a thickness of a casting film was set to 2632 μm, a film thickness after the film production process was over was set to 188 μm and the casting film was cooled by blowing a high speed air stream onto an air-side surface (opposite to a surface in contact with a chill roll) of the film and no baffle plates are placed on the plenum ducts in the thermo-setting zone.

Evaluation Method

The optical-use adhesive films obtained in Examples 4 to 7, Comparative Examples 3 to 4 and Referential Example 1 were evaluated on the following evaluation (2) in addition to the evaluation (1), wherein (1-5) was evaluated as in (2-3). The evaluation results are shown in Table 2.

(2-1) Difference between Thermal Shrinking Ratios

Measurements were performed in conformance with a method stipulated in JIS C 2318, wherein measuring points were sampled on an optical-use adhesive film with a distance of 100 mm between any two adjacent measuring points along a transverse direction to measure a thermal shrinking ratio. A difference between the maximum and minimum values of thermal shrinking ratios along a transverse direction was obtained from the measured values at the measuring points sampled.

(2-2) Pass-Through Property of Optical-use Adhesive Film

An optical-use adhesive film of a width of 1000 mm was subjected to a heat treatment at 100° C. while setting an intra-furnace tension at 98 N by means of a coater with a distance between two rolls of 1500 mm. The film that has received the heat treatment was passed through two rolls that were horizontally disposed at a distance therebetween of 2000 mm under a tension of 98 N in order to evaluate a planarity of the film. Herein, an iron bar was arranged at a central position between the rolls, which were spaced at a distance of 2000 mm, such that the top surface of the iron bar is located at a position, by 30 mm, lower than a common tangent to the top surfaces of the rolls. In passage through the rolls, if the film has no contact with the iron bar, an evaluation was expressed as ○ and if the film has contact with the iron bar, an evaluation was expressed as X. A evaluation process was performed in a continuous manner and recognition of whether or not the film was put in contact with the iron bar was visually conducted.

(2-3) Adhesiveness to Photo-Curable Acryl-Based Coating Layer

A hard coat agent (made by Dainichi Seika Co., SEIKA BEAM EXF01(B)) was applied on the surface of an optical-use adhesive layer of an optical-use adhesive film using a #8 wiper and after the coating, the coat was dried at 70° C. for 1 min to remove a solvent. After the removal of the solvent, a hard coat layer of a thickness of 3 μm was formed under irradiation with a high pressure mercury lamp of an illuminance of 200 mJ/cm$^2$ in conditions of an illumination distance of 15 cm and a running speed of 5 m /min. Adhesiveness was measured on an obtained film by means of a testing method in conformance with the description of section 8.5.1 of JIS-K5400. In description in a concrete manner, cuts were formed in a matrix structure including 100 squares using a cutter guide having clearance widths each of 2 mm so as to reach to a depth same as a thickness of the adhesive film. A cellophane pressure sensitive adhesive tape (made by Nichi Ban Co., of 24 mm width) was stuck on a surface on which cuts were formed and further pressed on the surface with an eraser rubber while rubbing to complete adhesion and thereafter, the cellophane tape was peeled off at a right angle to the film surface under confirmation by the naked eye and an adhesiveness was obtained from the following formula:

Adhesiveness (%)=(1−a peel area/a test area)×100.

the casting film was drawn in a longitudinal direction at a draw ratio of 3.5 times by using a roll group whose rolls have different circumferential speeds to obtain a uniaxially oriented PET film. After obtaining the uniaxially oriented

TABLE 2

| Item | thickness of base film (μm) | kind of coating liquid | coating amount (g/m²) | refractive index of base film (longitudinal/Nx) | refractive index of base film (transverse/Ny) | refractive index of adhesive layer (Nc) | value of equation (1) | haze (%) | total light transmittance (%) | thickness variation ratio (%) | adhesiveness | difference between thermal shrinking ratios (%) | pass-through property |
|---|---|---|---|---|---|---|---|---|---|---|---|---|---|
| Example 4 | 100 | AB-1 | 0.1 | 1.65 | 1.58 | 1.58 | 0.0149 | 0.4 | 92.1 | 1.7 | 100 | 0.09 | ○ |
| Example 5 | 125 | AB-1 | 0.1 | 1.66 | 1.68 | 1.58 | 0.0164 | 0.5 | 91.1 | 1.6 | 100 | 0.08 | ○ |
| Example 6 | 188 | AB-1 | 0.1 | 1.66 | 1.68 | 1.58 | 0.0164 | 0.5 | 91.6 | 1.5 | 100 | 0.05 | ○ |
| Example 7 | 250 | AB-1 | 0.1 | 1.67 | 1.67 | 1.59 | 0.0128 | 0.8 | 92.2 | 1.2 | 100 | 0.04 | ○ |
| Comparative Example 3 | 125 | A-1 | 0.1 | 1.66 | 1.68 | 1.54 | 0.0340 | 0.4 | 89.2 | 1.6 | 53 | 0.25 | x |
| Comparative Example 4 | 125 | B-1 | 0.1 | 1.66 | 1.68 | 1.59 | 0.0130 | 0.4 | 93.1 | 1.6 | 82 | 0.23 | x |
| Referential Example 1 | 188 | AB-1 | 0.1 | 1.66 | 1.68 | 1.58 | 0.0164 | 0.5 | 92.3 | 1.5 | 100 | 0.22 | x |

Example 8

(1) Preparation of Coating Liquid

A 30% aqueous dispersion of the polyester resin (A) obtained in Preparation of Coating Liquid in Example 1(1) in 6.7 parts, 40 parts of a 20% aqueous solution of a self-crosslinked polyurethane resin (B) having isocyanate groups blocked by sodium bisulfite (made by Dai-ichi Kogyo Seiyaku Co., a trade name of Elastron H-3), 0.5 part of Elastron catalyst (made by Dai-ichi Kogyo Seiyaku Co., a trade name of Cat 64), 44.3 parts of water and 5 parts of isopropyl alcohol are mixed to form a mixture and furthermore, 0.6 part of a 10% aqueous solution of an anionic surface active agent, 1.8 parts of 20% aqueous dispersion of spherical colloidal silica particles A (made by Nissan Kagaku Kogyo Co., a trade name of Snowtex OL) and 1.1 part of a 4% aqueous dispersion a dry process type silica particle B (made by Nihon Aerosil Co., Aerosil OX50, average particle size of 500 nm and average primary particle diameter of 40 nm) were added to the mixture to form a coating liquid (hereinafter referred to as a coating liquid AB-2a).

(2) Production of Adhesive Film

PET that had been obtained in a well known continuous polymerization method, whose intrinsic viscosity of 0.62 dl/g and which contains virtually none of inert particles are subjected to a heat treatment at 220° C. for 24 hr in a nitrogen stream at a pressure of 1115 hPa to obtain PET resin pellets whose intrinsic viscosity of 0.62 dl/g, containing cyclic trimers of 3000 ppm. After the pellets were subjected to the vacuum drying at 135° C. for 6 hr under a reduced pressure of 1.3 hPa, the pellets were supplied to an extruder and a melt sheet was extruded at about 280° C. to rapidly cool/solidify on a metal roll kept at a surface temperature of 20° C. and obtain a casting film of a thickness of 1400 μm. Herein, a residence time from the melting through rapid cooling/solidification is set to 6 min. Further, a sintered stainless filter medium of a filter particle size (at an initial filter efficiency of 95%) 15 μm was used as a filter medium for removal foreign matter in the molten resin.

Then, the casting film was heated by means of a heated roll group and an infrared heater to 100° C. and thereafter, PET film, the coating liquid was precision-filtered with a felt type polypropylene filter medium of a filter particle size (at an initial filter efficiency of 95%) 25 μm and the coating liquid was applied on one surface of the uniaxially oriented PET film by means of a reverse roll method. Subsequent to the application, while ends of the film was kept by clips, a coating layer was dried in a preheat zone of a tenter at 80° C. for 20 sec, followed by drawing in a transverse direction a of 4.0 times at 130° C. by in a transverse drawing zone. Then, the film was thermally fixed at 240° C., and relaxed at 3% in the transverse direction 200° C. Thus, an optical-use adhesive biaxially oriented PET film having a thickness of 188 μm was obtained. A content ratio of the particles A to the particles B in the coating layer was 8 and a content of the particles B was 0.42% by weight based on a total weight of a solid in the coating layer. Further, the coating amount was 0.10 g/m² as solid weight.

Example 9

An optical-use adhesive film was obtained in a process similar to Example 8 with the exception that a coating liquid (hereinafter referred to as coating liquid AB-2b) was prepared as follows: in Preparation of Coating Liquid of Example 8(1), a content ratio of the particles B to the particles A was set to 20, a content of the particles B was set to 0.17% by weight based on a total weight of a solid in an adhesive layer, and a residence time from the melting through the rapid cooling/solidification was set to 12 min.

It should be appreciated that a solid concentration in the coating liquid AB-2b was adjusted so as to be equal to that of Example 8 by controlling added amounts of water and isopropyl alcohol while keeping a ratio there between at a constant value. A content of cyclic trimers in a base film is shown in Table 3.

Example 10

An optical-use adhesive film was obtained in a process similar to Example 8 with the exception that a coating liquid (hereinafter referred to as coating liquid AB-2c) was prepared as follows: in Preparation of Coating Liquid of Example 8(1), a content ratio of the particles B to the particles A was set to 12, a content of the particles B was set to 0.41% by weight based on a total weight of a solid in an adhesive layer.

It should be appreciated that a solid concentration in the coating liquid AB-2c was adjusted so as to be equal to that of Example 8 by controlling added amounts of water and isopropyl alcohol while keeping a ratio there between at a constant value. A content of cyclic trimers in a base film is shown in Table 3.

Comparative Example 5

An optical-use adhesive film was obtained in a process similar to Example 8 with the exception that a coating liquid (hereinafter referred to as coating liquid B-2) was prepared as follows: in Preparation of Coating Liquid of Example 8(1), a polyester resin (A) was not added, wherein a content ratio of the particles B to the particles A was set to 8, a content of the particles B was set to 0.52% by weight based on a total weight of a solid in an adhesive layer.

It should be appreciated that a solid concentration in the coating liquid B-2 was adjusted so as to be equal to that of Example 8 by controlling added amounts of water and isopropyl alcohol while keeping a ratio there between at a constant value. A content of cyclic trimers in a base film is shown in Table 3.

Comparative Example 6

An optical-use adhesive film was obtained in a process similar to Example 8 with the exception that a coating liquid (hereinafter referred to as coating liquid A-2) was prepared as follows: in Preparation of Coating Liquid of Example 8(1), a polyurethane resin (B) was not added, wherein a content ratio of the particles B to the particles A was set to 8, a content of the particles B was set to 1.82% by weight relative to a solid in an adhesive film.

It should be appreciated that a solid concentration in the coating liquid A-2 was adjusted so as to be equal to that of Example 8 by controlling added amounts of water and isopropyl alcohol while keeping a ratio there between at a constant value. A content of cyclic trimers in a base film is shown in Table 3.

Referential Example 2

An optical-use adhesive film was obtained in a process similar to Example 8 with the exception that, in Production of Adhesive Film of Example 8(2), a residence time was set to 25 min. A content of cyclic trimers in a base film is shown in Table 3.

Evaluation Method

The optical-use adhesive films obtained in Examples 8 to 10, Comparative Examples 5 and 6, and Referential Example 2 were evaluated on the following evaluation (3) in addition to the evaluation (1). Herein, the evaluation item (1-5) was evaluated similar to the evaluation item (2-3). Evaluation Results are Shown in Table 3

(3-1) Increase in Haze Value

The adhesive layer of an optical-use adhesive film was eliminated with methylethylketone, thereafter, the film-whose the adhesive layer had been eliminated was subjected to a heat treatment at 150° C. for 120 min, wherein haze values before and after the heat treatment was measured, a difference therebetween was adopted as an increase in haze value. Measurement of a haze was performed using a haze meter (Tokyo Denshoku Kogyo Co., Model TC-H3DP).

(3-2) White Appearance Defect, Existent or Not

A mat black board was disposed behind a specimen and a test area 1 m$^2$ was observed by the naked eye under illumination of a fluorescent lamp. When at least one white appearance defect that was recognizable was observed by the naked eye, evaluation was expressed as "existent" but when no white appearance defect was observed by the naked eye, evaluation was expressed as "not existent."

TABLE 3

| Item | thickness of base film ($\mu$m) | kind of coating liquid | coating amount (g/m$^2$) | refractive index of base film (longitudinal/Nx) | refractive index of base film (transverse/Ny) | refractive index of adhesive layer (Nc) | value of equation (1) | haze (%) | total light transmittance (%) | thickness variation ratio (%) | adhesiveness | increase in haze value (%) | content of cyclic trimer | white apearance defect |
|---|---|---|---|---|---|---|---|---|---|---|---|---|---|---|
| Example 8 | 188 | AB-2a | 0.1 | 1.66 | 1.68 | 1.58 | 0.0164 | 0.6 | 92.6 | 1.5 | 100 | 0.4 | 3300 | not existent |
| Example 9 | 188 | AB-2b | 0.1 | 1.66 | 1.68 | 1.58 | 0.0164 | 0.6 | 91.9 | 1.5 | 100 | 0.5 | 4500 | not existent |
| Example 10 | 188 | AB-2c | 0.1 | 1.66 | 1.68 | 1.58 | 0.0164 | 0.6 | 93.1 | 1.5 | 98 | 0.4 | 3300 | not existent |
| Comparative Example 5 | 188 | B-2 | 0.1 | 1.66 | 1.68 | 1.59 | 0.0130 | 0.6 | 93.1 | 1.5 | 40 | 0.4 | 3300 | not existent |
| Comparative Example 6 | 188 | A-2 | 0.1 | 1.66 | 1.68 | 1.54 | 0.0340 | 1.2 | 92.7 | 1.5 | 9 | 0.4 | 3300 | not existent |
| Referential Example 2 | 188 | AB-2a | 0.1 | 1.66 | 1.68 | 1.58 | 0.0164 | 0.7 | 90.3 | 1.5 | 96 | 12.5 | 8000 | existent |

It can be recognized from Table 3 that, in an optical-use adhesive of the invention, as a content of cyclic trimers included in the base film is smaller, not only is an increase in haze value reduced but white appearance defects also come to nothing.

Next, there will be shown an example in which an optical-use adhesive film of the invention was improved on warpage in a heat treatment of a post-processing step.

Example 11

(1) Production of Adhesive Film

Pellets of polyethyleneterephthalate resin having none of inert particles and whose intrinsic viscosity is 0.62 dl/g as a film starting polymer were dried at 135° C. for 6 hr under a reduced pressure of 1.3 hPa. After the vacuum drying, the pellets were supplied to an extruder and a melt sheet was extruded at about 280° C. to rapidly cool/solidify on a metal roll kept at a surface temperature of 20° C. and obtain a casting film. At this time, a sintered stainless filter medium of a filter particle size (at an initial filter efficiency of 95%) 15 μm was used as a filter medium for removal foreign matter in the molten resin.

Then, the casting film was heated by means of a heated roll group and an infrared heater to 100° C. and thereafter, the casting film was draw in a longitudinal direction at a drawn ratio of 3.5 times by using a roll group whose rolls have different circumferential speeds to obtain a uniaxially oriented PET film. After obtaining the uniaxially oriented PET film, the coating liquid AB-2a prepared in Example 8(1) was precision-filtered with a felt type polypropylene filter medium of a filter particle size (at an initial filter efficiency of 95%) 25 μm and the coating liquid was applied on one surface of the uniaxially oriented PET film by means of a reverse roll method. Following the coating, end portions of the film were held by clips and dried in a preheat zone of a tenter at 80° C. for 20 sec. Subsequent to the drying, the film was in a transverse direction of 4.0 times at 130° C. in a transverse drawing zone. Then, the film was thermally fixed at 240° C., and relaxed at 3% in the transverse direction 200° C. Thus, an optical-use adhesive biaxially oriented PET film having a thickness of 188 μm was obtained. A content ratio of the particles B to the particles A in the coating layer of the film obtained was 8 and a content of the particles B was 0.42% by weight based on a total weight of a solid in the coating layer. A coating amount was 0.10 g/m² as a solid.

The film was further subjected to a heat treatment at 200° C. for 1 min while taking-up on a core reel. In the taking-up, a speed on the feed side was 10 m/min, a speed on the take-up side was 9.8 m/min and a film tension was 59 N/m.

Example 12

An optical-use adhesive film was obtained in a process similar to Example 11 with the exception that in Example 11, the coating liquid (AB-2a) prepared in Example 8(1) was replaced with the coating liquid (AB-2b) prepared in Example 9.

Example 13

An optical-use adhesive film was obtained in a process similar to Example 11 with the exception that in Example 11, the coating liquid (AB-2a) prepared in Example 8(1) was replaced with the coating liquid (AB-2c) prepared in Example 10.

Comparative Example 7

An optical-use adhesive film was obtained in a process similar to Example 11 with the exception that in Example 11, the coating liquid (AB-2a) prepared in Example 8(1) was replaced with the coating liquid (B-2) prepared in Comparative Example 5.

Comparative Example 8

An optical-use adhesive film was obtained in a process similar to Example 11 with the exception that in Example 11, the coating liquid (AB-2a) prepared in Example 8(1) was replaced with the coating liquid (A-2) prepared in Comparative Example 6.

Referential Example 3

An optical-use adhesive film was obtained in a process similar to Example 11 with the exception that in Example 11, a thermo-setting temperature was set to 200° C.

Evaluation Method

The optical-use adhesive films obtained in Examples 11 to 13, Comparative Examples 7 and 8, and Referential Example 3 were evaluated on the following evaluation (4) in addition to the evaluation (1). Herein, the evaluation item (1-5) was evaluated similar to the evaluation item (2-3). Evaluation Results are Shown in Table 4

(4-1) Warpage Value After Heat Treatment at 150° C. for 3 hr

A film specimen of a size of 300 mm×210 mm was subjected to a heat treatment at 150±3° for 3 hr. After the heat treatment, the specimen was placed on a flat table at room temperature for 30 min with nothing done thereto and a height (as a warpage value) of the specimen above a table surface was measured by means of a caliper with mm as a unit of measurement.

TABLE 4

| Item | thickness of base film (μm) | kind of coating liquid | coating amount (g/m²) | refractive index of base film (longitudinal/Nx) | refractive index of base film (transverse/Ny) | refractive index of adhesive layer (Nc) | value of equation (1) | haze (%) | total light transmittance (%) | thickness variation ratio (%) | adhesiveness | warpage after heat treatment (mm) |
|---|---|---|---|---|---|---|---|---|---|---|---|---|
| Example 11 | 188 | AB-2a | 0.1 | 1.66 | 1.68 | 1.58 | 0.0164 | 0.6 | 92.6 | 1.5 | 100 | 2 |
| Example 12 | 188 | AB-2b | 0.1 | 1.66 | 1.68 | 1.58 | 0.0164 | 0.6 | 91.9 | 1.5 | 100 | 2.1 |
| Example 13 | 188 | AB-2c | 0.1 | 1.66 | 1.68 | 1.58 | 0.0164 | 0.6 | 93.1 | 1.5 | 99 | 2 |
| Comparative Example 7 | 188 | B-2 | 0.1 | 1.66 | 1.68 | 1.59 | 0.0130 | 0.6 | 93.1 | 1.5 | 41 | 2.1 |

TABLE 4-continued

| Item | thickness of base film ($\mu$m) | kind of coating liquid | coating amount (g/m$^2$) | refractive index of base film (longitudinal/Nx) | refractive index of base film (transverse/Ny) | refractive index of adhesive layer (Nc) | value of equation (1) | haze (%) | total light transmittance (%) | thickness variation ratio (%) | adhesiveness | warpage after heat treatment (mm) |
|---|---|---|---|---|---|---|---|---|---|---|---|---|
| Comparative Example 8 | 188 | A-2 | 0.1 | 1.66 | 1.68 | 1.54 | 0.0340 | 1.2 | 92.7 | 1.5 | 9 | 2.2 |
| Referential Example 3 | 188 | AB-2a | 0.1 | 1.66 | 1.68 | 1.58 | 0.0164 | 0.6 | 90.3 | 1.5 | 96 | 3.5 |

It can be recognized from Table 4 that an optical-use adhesive film of the invention that has been subjected to a thermo-setting processing under predetermined conditions can be smaller in warpage value.

Next, an example in which an optical-use adhesive film of the invention was subjected to an emboss processing. Such an optical-use adhesive film that has been subjected to emboss processing was subjected to evaluation (5). Evaluation results are shown in Table 5.

(5-1) Ratio of Sum of Vertical Projection Areas on Film Surface of Optical-use adhesive Film of Portions Thereof Deformed by Emboss Processing, to Total Area of Optical-use Adhesive Film with Which Emboss-Processing Roll Is Put into Contact (Protrusion Area Ratio)

A picture, increased in size with magnification of 20, of a portion of a film including a protrusion that was observed in an optical fiber microscope (keyens Co.; VH-6110) was printed using a color video printer (made by Sony Co.; CVP-M3). Ten deformed portions caused by the emboss processing were evaluated as squares each having the closest area to a deformed portion possible and thus selected most closest squares were actually measured on longitudinal and transverse sides. Vertical projection areas of the deformed portions were calculated as products each of the longitudinal side length multiplied by the transverse side length and the average area per one square (A:mm$^2$/one deformed portion) was calculated from areas of the 10 squares as the average of the vertical projection areas of deformed portions by the emboss processing. The number (N) of protrusions in a rectangle of a transverse length (W:mm) and 100 mm along a longitudinal direction was obtained, the rectangle being part of a region with which the emboss-processing roll was put in contact, and a protrusion area ratio was calculated by the following formula (1):

Protrusion area ratio=($N \times A$)/($100 \times W$)  (1).

(5-2) Average Film Thickness

Twenty points were selected at random in a non-processed region of a film and thicknesses were measured there using a digital micrometer (made by a Sony Magnescale Co.; M-30) and the average of the thicknesses was adopted as an average film thickness ($\mu$m).

(5-3) Average Height of Deformed Portions by Emboss Processing

Apparent thicknesses at 20 points on a film in an emboss processed region and thicknesses at 20 points on the film very close to the emboss processed region were measured using a digital micrometer (made by a Sony Magnescale Co.; M-30) and a difference between the averages from both sets of measured thicknesses was adopted as an average height ($\mu$m) of deformed portions by the emboss processing.

(5-4) Air Containment Ratio

An air containment ratio (A1/A2 in %) was defined as a share of an area (A2) in section of a film roll: the share is an area in section occupied by air contained in the film roll relative to a total area (A1) in section of the film roll itself.

Herein, a sectional area of the film roll (A1 in m$^2$) is calculated in a procedure that first, a roll diameter is calculated from a circumferential length of the film roll and in turn, a sectional area (in mm$^2$) of the film roll is calculated. On the other hand, a sectional area (in mm$^2$) of a core reel is calculated. A sectional area (A1) of the film roll itself can be calculated by means of the following formula (2):

A sectional area of a film roll itself (A1)=a total sectional area of the film roll–a sectional area of a core reel  (2)

A sectional area of contained air (A2) can be obtained by means of the following formula (3) based on a sectional area of the film roll itself (A1), a total film take-up length (m) and an average film thickness (in $\mu$m):

A sectional area of contained air (A2)=a sectional area of a film roll itself (A1)–a total film take-up length (m)×an average film thickness (in $\mu$m)  (3).

(5-5) Disturbance in Film Planarity

A film was unwound by a length of 3 m in a longitudinal direction from a film roll and an unwound film was spread over on a planar table; the disturbance was determined by the naked eye in three levels associated with a degree of disturbance, evaluation was conducted using marks as shown below together with descriptions of definition thereof: ⊚: no disturbance in planarity is observed, ○: some disturbance in planarity is observed, and X: prevailed disturbance in planarity is observed.

(5-6) Generation of Surface Flaw, Existent or Not

A film was unwound by a length of 1 m in a longitudinal direction from a film roll and whether of not surface flaws are existent across both surfaces of the film in a dark room was observed/determined by visually detecting a reflecting light beam from a film surface under illumination of a light flux from a light source in an incident direction thereof oblique to an observation surface, wherein a video shooting light (made by LPL Co. LPL VIDEO LIGHT VL-302 with a halogen lamp 100V1300W) was employed as the light source.

(5-7) Accelerated Test for Estimation of Long Term Storage

A film roll was stored in a room for 30 days at 40° C. and 70% RH while the film roll was sustained by both ends of a core reel thereof such that the film roll was not in no direct contact with the floor and an accelerated test was performed for estimation of a long term storage effect. After the storage, the following evaluation items were performed: an air containment ratio, a disturbance in planarity and generation of surface flaws, existent of not.

Example 14

Emboss processing was applied on an optical-use adhesive film having a thickness of 125 μm obtained in Example 2 and thereby, there was obtained a processed film processed in such a manner that a protrusion area ratio was 0.18, an area that was obtained by a vertical projection on a film surface of a deformed portion caused by the emboss processing is 0.12 mm² and an average height of deformed portions caused by the emboss processing was 10 μm. Following the emboss processing, a film roll was produced in operational conditions that a take-up tension was 10 kg/m and a take-up surface pressure was 2.5 kg/m. Immediately after the take-up and after the accelerated long term storage, an air containment ratio was 0.06, no disturbance in planarity was observed and none of surface flaws were visually observed.

Referential Example 4

A processed film and a film roll were obtained similar to Example 14 with the exception that a protrusion area ratio Example 16

A processed film and a film roll were obtained in a process similar to Example 14 with the exception that, in Example 14, an optical-use adhesive film having a thickness of 100 μm obtained in Example 1 was used and a protrusion area ratio and others were set as shown in Table 5.

Example 17

A processed film and a film roll were obtained in a process similar to Example 14 with the exception that, in Example 14, an optical-use adhesive film having a thickness of 50 μm obtained in Example 3 was used and a protrusion area ratio and others were set as shown in Table 5.

Example 18

A processed film and a film roll were obtained in a process similar to Example 14 with the exception that, in Example 14, an optical-use adhesive film having a thickness of 250 μm obtained in Example 7 was used and a protrusion area ratio and others were set as shown in Table 5.

Referential Example 5

A processed film and a film roll were obtained in a process similar to Example 14 with the exception that, in Example 14, an optical-use adhesive film having a thickness of 100 μm obtained in Example 1 was used and a protrusion area ratio and others were set as shown in Table 5.

TABLE 5

|  | film thickness T μm | protrusion area ratio — | average protrusion area mm² | average height/ sion height H μm | thickness H/T % | processed region width Mm | immediate after take-up | | | after accelerated processing for estimation of long term storage | | |
|---|---|---|---|---|---|---|---|---|---|---|---|---|
|  |  |  |  |  |  |  | air containment ratio % | disturbance in planarity — | surface flaw generation — | air containment ratio % | disturbance in planarity — | surface flaw generation — |
| Example 14 | 125 | 0.18 | 0.12 | 10 | 8.0 | 10 | 0.06 | ⊚ | not existent | 0.06 | ⊚ | not existent |
| Reference Example 4 | 125 | 0.008 | 0.12 | 10 | 8.0 | 10 | 0.06 | ⊚ | not existent | 0.02 | x | existent |
| Example 15 | 188 | 0.22 | 0.18 | 25 | 13 | 15 | 0.10 | ⊚ | not existent | 0.08 | ⊚ | not existent |
| Example 16 | 100 | 0.13 | 0.03 | 5 | 5.0 | 7 | 0.04 | ⊚ | not existent | 0.03 | ○ | not existent |
| Example 17 | 50 | 0.08 | 0.02 | 4 | 8.0 | 10 | 0.05 | ⊚ | not existent | 0.04 | ○ | not existent |
| Example 18 | 250 | 0.16 | 0.16 | 10 | 4.0 | 10 | 0.04 | ⊚ | not existent | 0.04 | ○ | not existent |
| Reference Example 5 | 100 | 0.30 | 0.10 | 10 | 10 | 10 | 0.13 | x | not existent | no evaluation | | | was 0.008. While no problem was generated immediate after the take-up, there happened reduction in air containment ratio after an accelerated processing for estimation of a long term storage (0.06 prior to the storage changed to 0.02 after the storage) and not only was a planarity disturbed but surface flaws were observed as well.

Example 15

A processed film and a film roll were obtained in a process similar to Example 14 with the exception that, in Example 14, an optical-use adhesive film having a thickness of 188 μm obtained in Example 6 was used and a protrusion area ratio and others were set as shown in Table 5.

It is recognized from Table 5 that, among rolls of optical-use adhesive films of the invention, rolls whose film have each received a predetermined processing have neither disturbance in planarity nor generation of surface flaws not only immediately after the take-up but also after an accelerated processing for estimation of long term storage.

An optical-use adhesive film of the invention has superior transparency and adhesive and in addition, a small thickness variation ratio. Further, since an optical-use adhesive film of the invention has superior post-processing adaptability such as transportability of a film in a heat treatment of a post processing step such as prism lens processing, hard coat processing and anti-reflection processing, product yield can be high. Still further, since an optical-use adhesive film of the invention has a small increase in haze value and superior planarity, wide applications for various kinds of optical parts and members are ensured. Especially, as optical-use films, an optical-use adhesive film of the invention is very useful in applications for a base film of a prism sheet used in LCD, a base film for a back light, base films of hard coat processing and an anti-reflection film, a protective film for CRT and so on.

Furthermore, when a optical-use adhesive film is handled in a take-up step, air wound into a gap between film turns that is caused by an accompanying air stream when a film is taken-up on a core reel in the form of a roll is properly rejected out of the roll, thereby, entailing a film roll with a good appearance which contains air layers of an optimal amount of air therein. Furthermore, since such appropriate air layers are retained for a long time in storage, not only can a good take-up appearance be maintained, but no generation of surface flaws is observed over a long time in storage. Accordingly, a degree of freedom in adjustment of production schedule is greatly raised and loss in operation such as caused by a change of specifications, brands or the like is decreased. Besides, not only can a product roll quality be improved but troubles with customers can be reduced.

What is claimed is:

1. An optical-use adhesive film, comprising a base film of the optical-use adhesive film is a biaxially oriented polyester film having a thickness equal to or more than 50 µm, and an adhesive polymer layer laminated on at least one surface of the base film, wherein refractive indexes of the base film in longitudinal and transverse directions are both in the range of from 1.55 to 1.70 and that refractive indexes of the adhesive layer and the base film satisfies the following formula (1):

$$(Nx-Nc)^2+(Ny-Nc)^2 \leq 0.0300 \quad (1),$$

wherein Nx and Ny respectively indicate refractive indexes in longitudinal and transverse directions of a base film and Nc is a refractive index of an adhesive layer.

2. An optical-use adhesive film according to claim 1, wherein a thickness of the base film is in the range of from 100 to 300 µm.

3. An optical-use adhesive film according to claim 1, wherein the biaxially oriented polyester film is a polyester film made from polyethylene terephthalate as a main component.

4. An optical-use adhesive film according to claim 1, wherein the polymer adhesive layer includes a copolymerized polyester-based resin and a polyurethane-based resin.

5. An optical-use adhesive film according to claim 4, wherein the copolymerized polyester-based resin has a branched monomer as a constituent.

6. An optical-use adhesive film according to claim 1, wherein the polymer adhesive layer includes particles.

7. An optical-use adhesive film according to claim 6, wherein the adhesive layer include particles having an average size in the range of from 20 nm to 300 nm, only the lower limit being included, and particles of an average size in the range of from 300 nm to 1000 nm, both limits being included.

8. An optical-use adhesive film according to claim 1, wherein a haze value of the optical-use adhesive film is equal to or less than 1.0%.

9. An optical-use adhesive film according to claim 1, wherein that a thickness variation ratio is equal to or less than 3%.

10. An optical-use adhesive film according to claim 1, wherein a difference between the maximum value of a longitudinal thermal shrinking ratio and the minimum value thereof along a transverse direction of the optical-use adhesive film is equal to or less than 0.2%.

11. An optical-use adhesive film according to claim 1, wherein an adhesiveness of the optical-use adhesive film when a photo-curable acryl-based coating layer is laminated on an adhesive layer is equal to or higher than 85% in adhesiveness obtained from the following formula (2) whose valuables on its left side are determined by a testing method in conformance with description in a section 8.5.1 of JIS-K5400:

$$\text{Adhesiveness (\%)}=(1-\text{peel area/test area})\times 100 \quad (2).$$

12. An optical-use adhesive film according to claim 1, wherein a total light transmittance of the optical-use adhesive film is equal to or higher than 90% and an increase in haze value after the optical-use adhesive film receives a heat treatment at 150° C. for 120 min is equal to or less than 0.5%.

13. An optical-use adhesive film according to claim 1, wherein a content of cyclic trimers in the base film is equal to or less than 5000 ppm.

14. An optical-use adhesive film according to claim 1, wherein a total light transmittance of the optical-use adhesive film is equal to or higher than 90% and a warpage of the optical-use adhesive film in a specimen size 300 mm×210 mm after the optical-use adhesive film receives a heat treatment at 150° C. for 3 hr is equal to or less than 3 mm.

15. An optical-use adhesive film according to claim 1, wherein protrusions are formed, by an emboss-processing roll, on at least one surface of the optical-use adhesive film in the neighborhoods of both ends in a transverse direction thereof, wherein a ratio of a sum of vertical projection areas on a film surface of the optical-use adhesive film of portions thereof deformed by emboss processing, to a total area of the optical-use adhesive film with which the emboss-processing roll is put into contact is in the range of from 0.01 to 0.25.

16. An optical-use adhesive film according to claim 15, wherein a vertical projection area on a film surface of the optical-use adhesive film of any one portion thereof deformed by emboss processing is in the range of from 0.01 to 0.2 mm².

17. An optical-use adhesive film according to claim 15, wherein a height of a portion of the optical-use adhesive film deformed by emboss-processing is in the range of from 1 to 20% of an average thickness of a non-processed region thereof.

18. An optical-use adhesive film according to claim 15, wherein an average thickness of a non-processed region of the optical-use adhesive film is in the range of from 30 to 300 µm and an average height of portions of the optical-use adhesive film deformed by emboss-processing is in the range of from 3 to 30 µm.

19. An optical-use adhesive film according to claim 15, wherein a width of a region that is emboss-processed in the optical-use adhesive film is in the range of from 5 to 20 mm.

20. A roll that is obtained by take-up an optical-use adhesive film according to claim 15.

* * * * *